US012786733B2

(12) United States Patent
Khalid et al.

(10) Patent No.: US 12,786,733 B2
(45) Date of Patent: Nov. 3, 2026

(54) METHODS AND APPARATUS FOR PROVIDING AN ALTERNATIVE COMMUNICATIONS PATH BETWEEN A BASE STATION AND A SPECTRUM ACCESS SYSTEM (SAS)

(71) Applicant: Charter Communications Operating, LLC, St. Louis, MO (US)

(72) Inventors: Saran Khalid, Denver, CO (US); MohammedYusuf Shaikh, Aurora, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 181 days.

(21) Appl. No.: 18/770,493

(22) Filed: Jul. 11, 2024

(65) Prior Publication Data

US 2026/0019823 A1 Jan. 15, 2026

(51) Int. Cl.
*H04W 76/20* (2018.01)
*H04W 16/14* (2009.01)
*H04W 68/02* (2009.01)

(52) U.S. Cl.
CPC ........... *H04W 16/14* (2013.01); *H04W 68/02* (2013.01); *H04W 76/20* (2018.02)

(58) Field of Classification Search
CPC ...... H04W 16/14; H04W 76/20; H04W 68/02
USPC ........................................................ 370/329
See application file for complete search history.

(56) References Cited

U.S. PATENT DOCUMENTS

2023/0007497 A1* 1/2023 Singh .................... H04W 16/14
2025/0350968 A1* 11/2025 Khalid .................. H04W 24/04

* cited by examiner

*Primary Examiner* — Ayman A Abaza
*Assistant Examiner* — Hasan Ali Cheema
(74) *Attorney, Agent, or Firm* — Straub & Straub; Michael P. Straub; Stephen T. Straub

(57) ABSTRACT

An alternative channel for communicating information relating to renewal of a spectrum grant from SAS to a base station is implemented. This alternative channel provides a communications path to communicate status of a grant from an SAS to the base station, while the base station's primary communication channel with SAS, which typically involves a domain proxy remains interrupted. The alternative channel includes a UE with a connection manager (CM). An identified UE sends a grant renewal request message to SAS for the base station and receives a grant renewal request response message indicating grant status from the SAS. The grant status is forwarded to the base station, and if the grant is renewed, the base station renews the grant transmit expiration time and continues to transmit. This approach reduces potential service outages at the base station due to lack of awareness of the actual status of the SAS grant.

20 Claims, 13 Drawing Sheets

METHODS AND APPARATUS FOR PROVIDING AN ALTERNATIVE COMMUNICATIONS PATH BETWEEN A BASE STATION AND A SPECTRUM ACCESS SYSTEM (SAS)

FIELD

The present application relates to wireless networks and more particularly to methods and apparatus for increasing the reliability of communications between a base station, e.g., a CBRS gNB, and a spectrum access system (SAS), e.g., via implementation of an alternative communication path to be used in the event of a suspected failure of the traditional communications path.

BACKGROUND

Multiple System Operators (MSOs) have recently been establishing their own Citizens Broadband Radio Services (CBRS) networks to service their subscriber UEs whenever possible. CBRS networks require registration, e.g., registration of each one or more CBRS base stations, and grant(s), e.g., a spectrum grant to one or more of the registered CBRS base stations from a Spectrum Access System (SAS) for the CBRS network to function. A grant to a CBRS base station is renewed by an SAS via a heartbeat process which involves the CBRS base station receiving a heartbeat signal, e.g., a heartbeat message, sometimes referred to simply as a heartbeat, from the SAS. Traditionally, the heartbeat is communicated using the radios of the CBRS base station and a domain proxy. However, sometimes the communication between a CBRS base station, e.g., a gNB CBRS base station, and a SAS can get interrupted, e.g., due to software upgrades, communication channel changes, outage of the domain proxy, problems with an interface on the CBRS base station, domain proxy or SAS, problems with a communications link along the traditional communications path, or for other reasons. This interruption of the communications between the CBRS base station and the SAS can result in the CBRS base station not receiving a message indicating that the grant is being renewed, and the CBRS base station will stop using the previously granted spectrum since it is unaware that the SAS has renewed the grant. This can result in the CBRS base station being effectively shut down with regard to operations servicing its UEs, and the UEs, operating the CBRS base station will need to transition to another base station, e.g., a mobile network operator (MNO) partner network macro base station, if available. This can result in a degraded quality of experience to the UE subscribers and/or cost increases from the perspective of the MSO UE subscriber and/or MSO.

It is desirable, from the perspective of a MSO operator, which has its own CBRS network including its own CBRS base stations, to keep its subscriber UEs on its own network. Based on the above discussion there is a need for new methods and apparatus to increase the robustness of the communications between CBRS base stations and SAS. In particular, it would be desirable if an alternative communications path between a base station and SAS could be supported in the event of a failure with regard to a primary communications path between the base station and SAS.

SUMMARY

Methods and apparatus, in accordance with some embodiments of the present invention, provide an alternative channel for renewal of a grant from an SAS to a base station, e.g., a CBRS gNB. This alternative channel provides a means to get status of a grant from SAS directly and provide it to the base station, while its traditional communication channel with SAS, which typically involves a domain proxy remains interrupted. In accordance with a feature of some embodiments of the present invention, the alternative channel includes a path which includes a user equipment (UE) with a connection manager (CM) and a server, e.g., a connection manager (CM) server. In some such embodiments, a UE with CM within the MSO network will take on the task of getting the status through the MSO's network or MNO's network. The grant status/grant renewal message is delivered to the base station, e.g., CBRS gNB, and if the grant is renewed, the base station, e.g., CBRS gNB, renews the grant expiration and continues to transmit.

Methods and apparatus, in accordance with the present invention, include steps and architecture to support the renewal of a grant via an alternative path, when the base station, e.g. CBRS gNB, and SAS are unable to communicate via the traditional path, e.g. through a domain proxy. A CM application on the UE and a CM server play important roles in this alternative method of renewal of grant via an alternative path.

In some embodiments, the base station, e.g. CBRS gNB, detects that a predetermined time to grant expiration has been reached, e.g., indicating that there is a problem with the traditional path between the base station, e.g. CBRS gNB, and SAS, and in response sends an upcoming timing expiration notification to its access and mobility management function (AMF). The AMF determines whether or not there is an active UE with CM at the base station, which can be used to communicate a grant renewal request to the SAS via an alternative path. If the AMF determines that there is at least one active UE, which can be used, the AMF selects one of the active UEs to be used to send a grant renewal request to the SAS via an alternative path. If the AMF determines that there are not any active UEs with CM, which can be used, the AMF finds the most recently active (but currently inactive) UE with CM at the base station, initiates paging of the most recently active UE and RRC re-connection operations are performed to transition the identified UE into an RRC connected mode. The AMF sends a grant renewal request to the selected or identified UE with CM for delivery to the SAS via the connection manager (CM) server. The CM application in the UE decides whether the path is to be via the MSO network or via the MNO network. Subsequently, the UE with CM receives a grant renewal request response from the SAS communicated via the CM server and forwards the grant renewal request response to the AMF, which forwards the grant renewal request response to the base station, e.g. CBRS gNB. If the grant renewal request response is positive, indicating the SAS spectrum grant is renewed, the base station, e.g. CBRS gNB renews the transmit expiration time and continues to use the spectrum in the area with the renewed grant.

An exemplary communications method, in accordance with some embodiments, comprises: detecting, at a first base station, reaching a predetermined time to Spectrum Access System (SAS) resource grant expiration; sending, from the first base station, in response to reaching the predetermined time to grant expiration, an upcoming timer expiration message to an access and mobility management function (AMF); and operating the AMF to send a grant renewal request corresponding to the first base station to a first UE for communication to an SAS.

While various features are discussed in the above summary, all features discussed above need not be supported in all embodiments and numerous variations are possible. Additional features, details and embodiments are discussed in the detailed description which follows.

DETAILED DESCRIPTION

Figure 1:
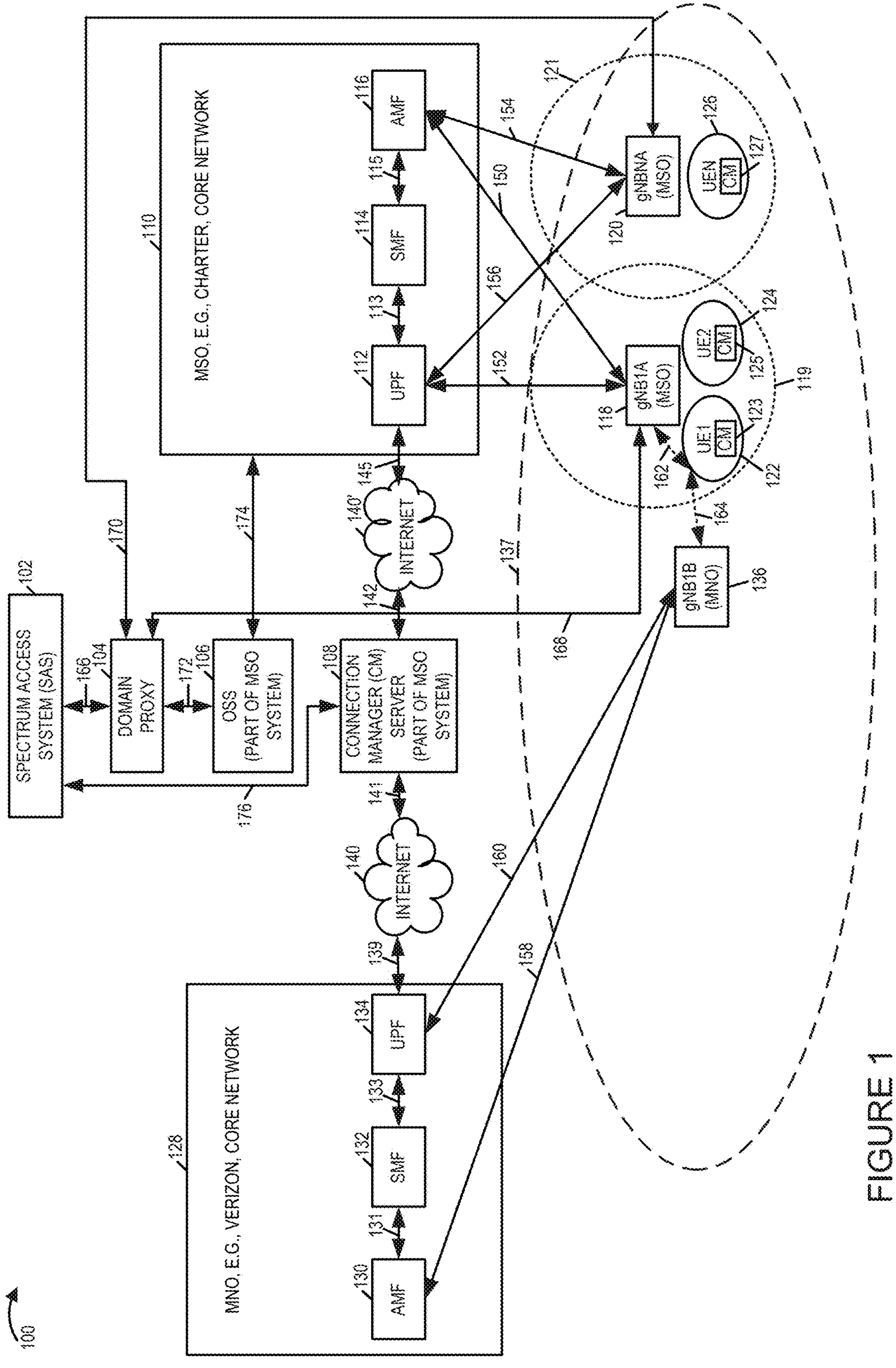
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a spectrum access system (SAS) 102, a domain proxy 104, an operation support system (OSS) 106, a connection manager (CM) server 108, a Multiple-System Operator (MSO), e.g., Charter, core network 110, a Mobile network Operator (MNO), e.g., Verizon, core network 128, a plurality of MSO base stations (gNB1A 118, . . . gNBNA 120), e.g., a plurality of Citizens Broadband Radio Services (CBRS) base stations, and a MSO base station (gNB1B 136), e.g., a macro base stations, coupled together as shown.

SAS 102 is coupled to domain proxy 104 via communications link 166. SAS 102 is coupled to connection manager server 108 via communications link 176. Domain proxy 104 is coupled to OSS 106 via communications link 172. OSS 106 is coupled to MSO core network 110 via communications link 174. In various embodiments, OSS 106 and CM server 108 are part of the MSO system.

Each of the MSO base stations (gNB1A 118, . . . , gNBNA120), has a corresponding wireless coverage area (119, . . . , 121), respectively. The MNO base station, gNB1B 136, has a corresponding wireless coverage area 137. Exemplary communications system 100 further includes a plurality of user equipments (UE 1 122, UE 2 124, . . . , UEN 126) corresponding to the MSO, e.g. Charter. Each of the UEs (122, 124, . . . , 126) includes a corresponding connection manager (CM) module (123, 125, . . . , 127) used for communicating with the CM server 108. In various embodiments, the UEs (122, 124, . . . , 126) are dual SIM dual standby (DSDS) UEs, e.g., including a SIM card corresponding to the MSO and SIM card corresponding to the MNO. In various embodiments, it is desirable that the UEs (122, 124, . . . , 126) use the MSO base stations (118, . . . , 120), whenever adequate service can be provided in accordance with the service agreement and utilize the MNO's base stations as a back-up, e.g., in situations in which MSO service is not available or cannot be provided with adequate QoS.

MSO core network 110 includes a plurality of functions/modules including an access and mobility management function (AMF) 116, a session management function (SMF) 114, and a user plane function (UPF) 112. MNO core network 128 includes a plurality of functions/modules including an access and mobility management function (AMF) 130, a session management function (SMF) 132, and a user plane function (UPF) 134.

MSO gNB1A base station 118, e.g., a CBSD, is coupled to AMF 116 via connection 150 and is coupled to UPF 112 via connection 152. MSO gNBNA base station 120, e.g., a CBSD, is coupled to AMF 116 via connection 154 and is coupled to UPF 112 via connection 156. MSO gNB1A base station 118 is further coupled to domain proxy 104 via communications link 168. MSO gNBNA base station 120 is further coupled to domain proxy 104 via communications link 170. UPF 112 is coupled to CM server 108 via connection 145, Internet portion 140' and connection 142. UPF 134 is coupled to CM server 108 via connection 139, Internet portion 140 and connection 141. MNO gNB1B base station 136 is coupled to AMF 130 via connection 158. MNO gNB1B base station 136 is coupled to UPF 134 via connection 160. AMF 130 is coupled to SMF 132 via connection 131. SMF 132 is coupled to UPF 134 via connection 133.

At least some of the UEs (UE1 122, UE2 124, . . . . UEN 126) are mobile devices which may move throughout the system 100 and be connected to different base stations at different times. Exemplary UE1 122 is shown connected to MSO gNB1A base station 118 via wireless communications link 162 and is shown connected to MNO gNB1B base station 136 via wireless communications link 164.

Typically, a grant request (for spectrum) and a corresponding grant request response are communicated between MSO gNB1A 118 and SAS 102 via a path including connection 168, domain proxy 104 and connection 166. Heartbeat messages are also communicated along this path. An interface or connection along this path may fail. In accordance with a feature of the present invention, an alternative path between gNB1A 118 and SAS 102 is established and used, said alternative path including a UE including a CM, e.g., UE1 122 including CM 123 and the CM server 108.

Figure 2A:
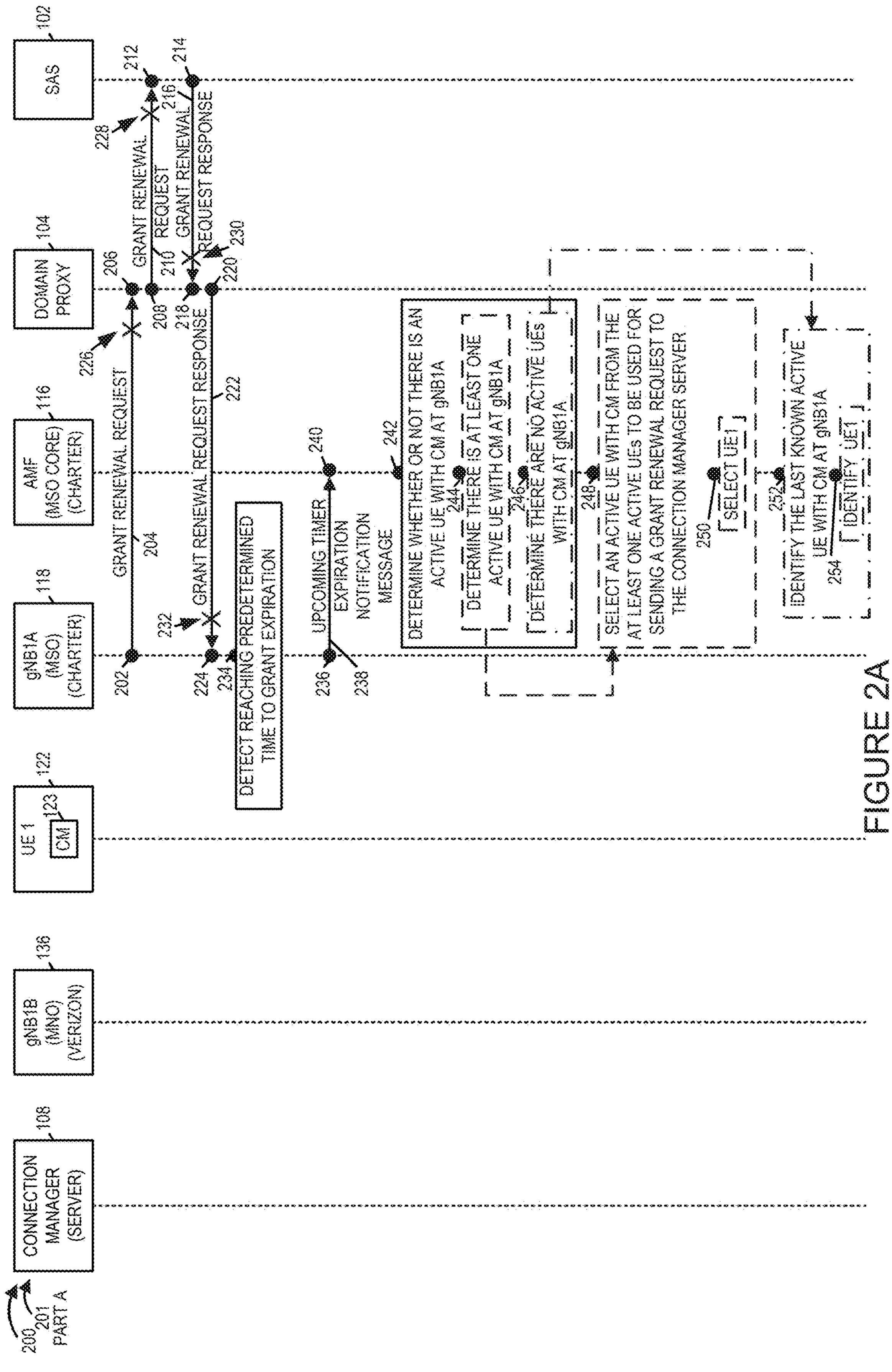
FIG. 2A is a first part of a signaling diagram comprising of an exemplary method of operating a communications system in accordance with an exemplary embodiment.
Figure 2B:
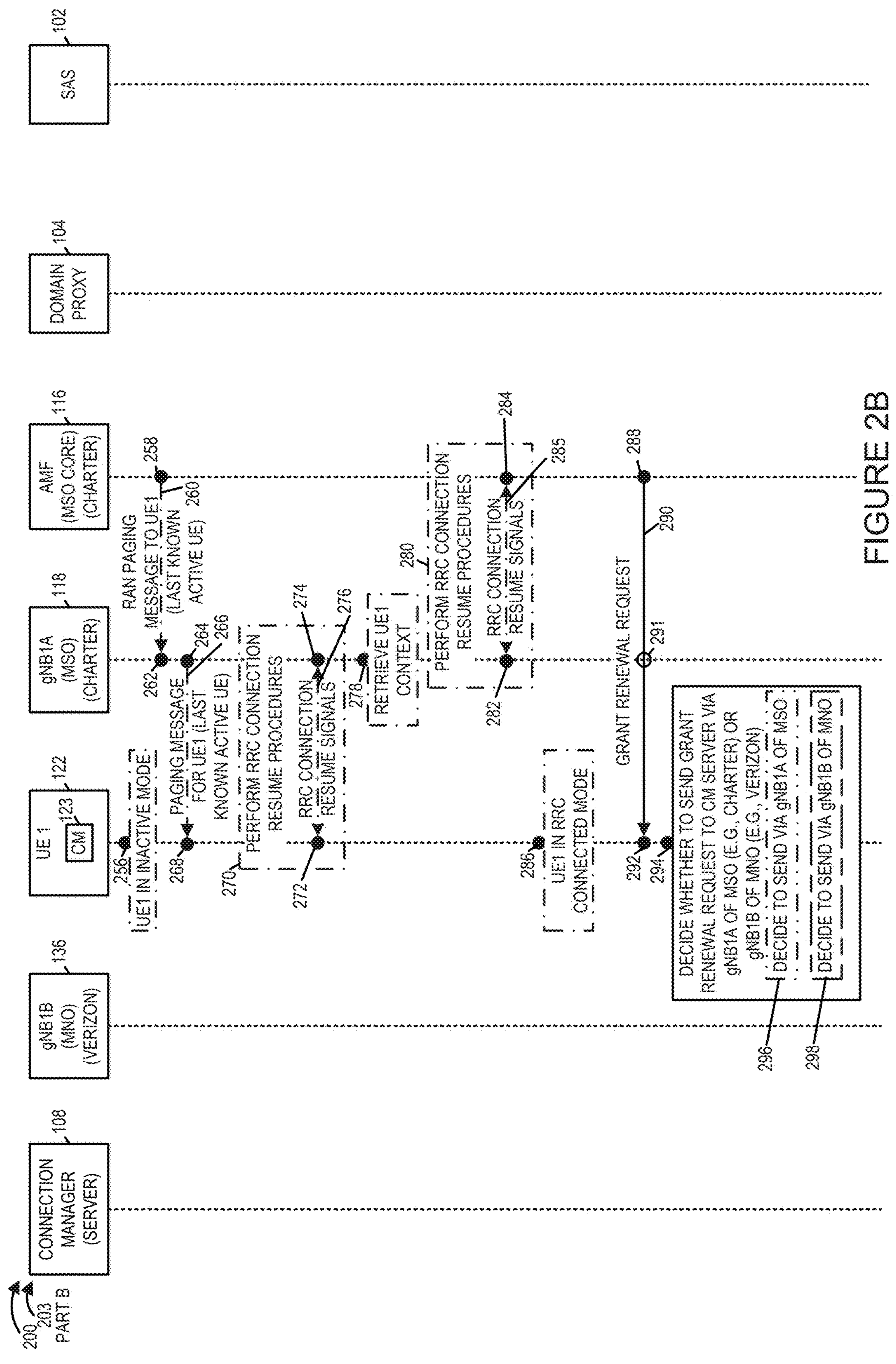
FIG. 2B is a second part of a signaling diagram comprising of an exemplary method of operating a communications system in accordance with an exemplary embodiment.
Figure 2C:
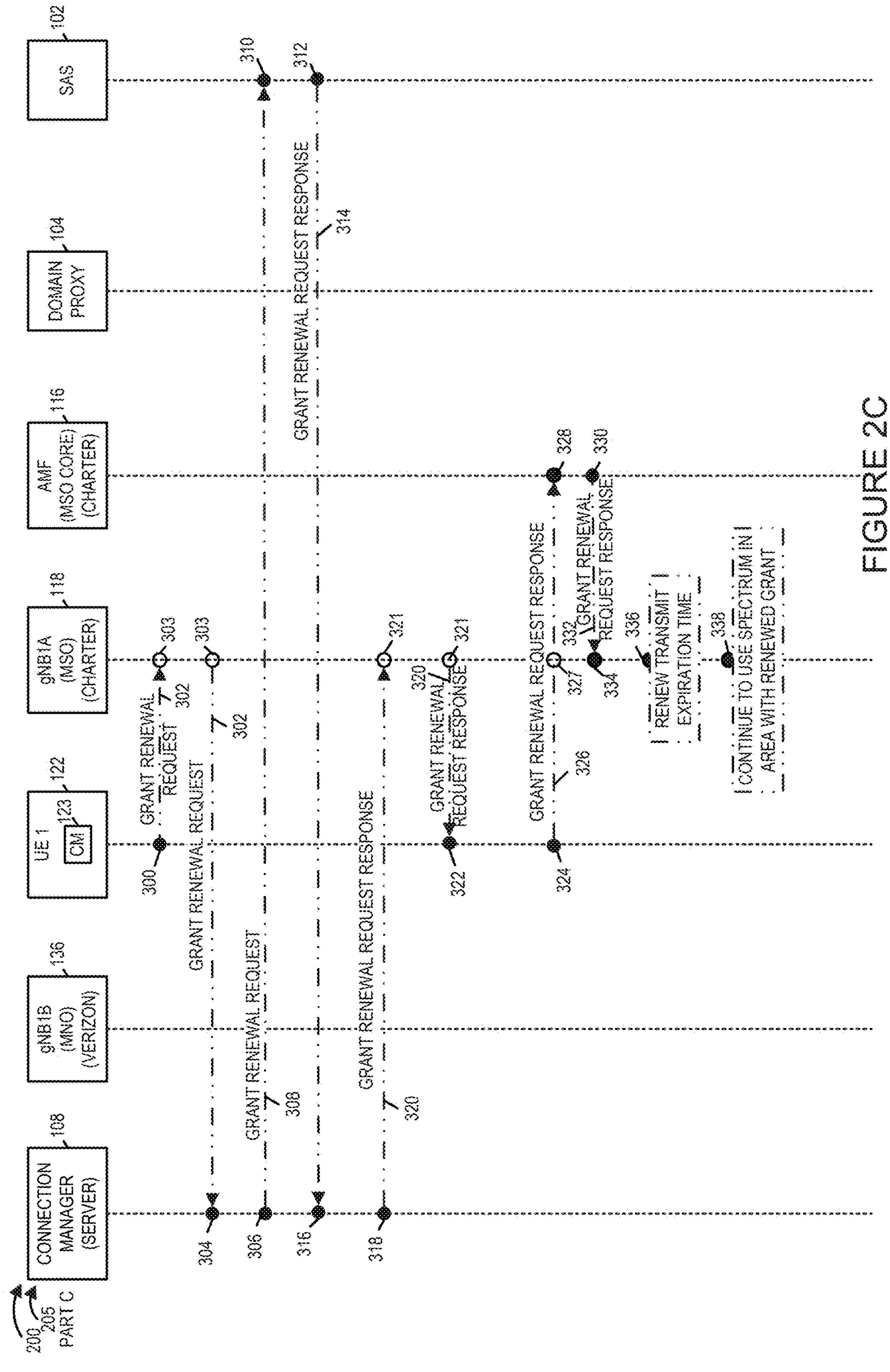
FIG. 2C is a third part of a signaling diagram comprising of an exemplary method of operating a communications system in accordance with an exemplary embodiment.
Figure 2D:
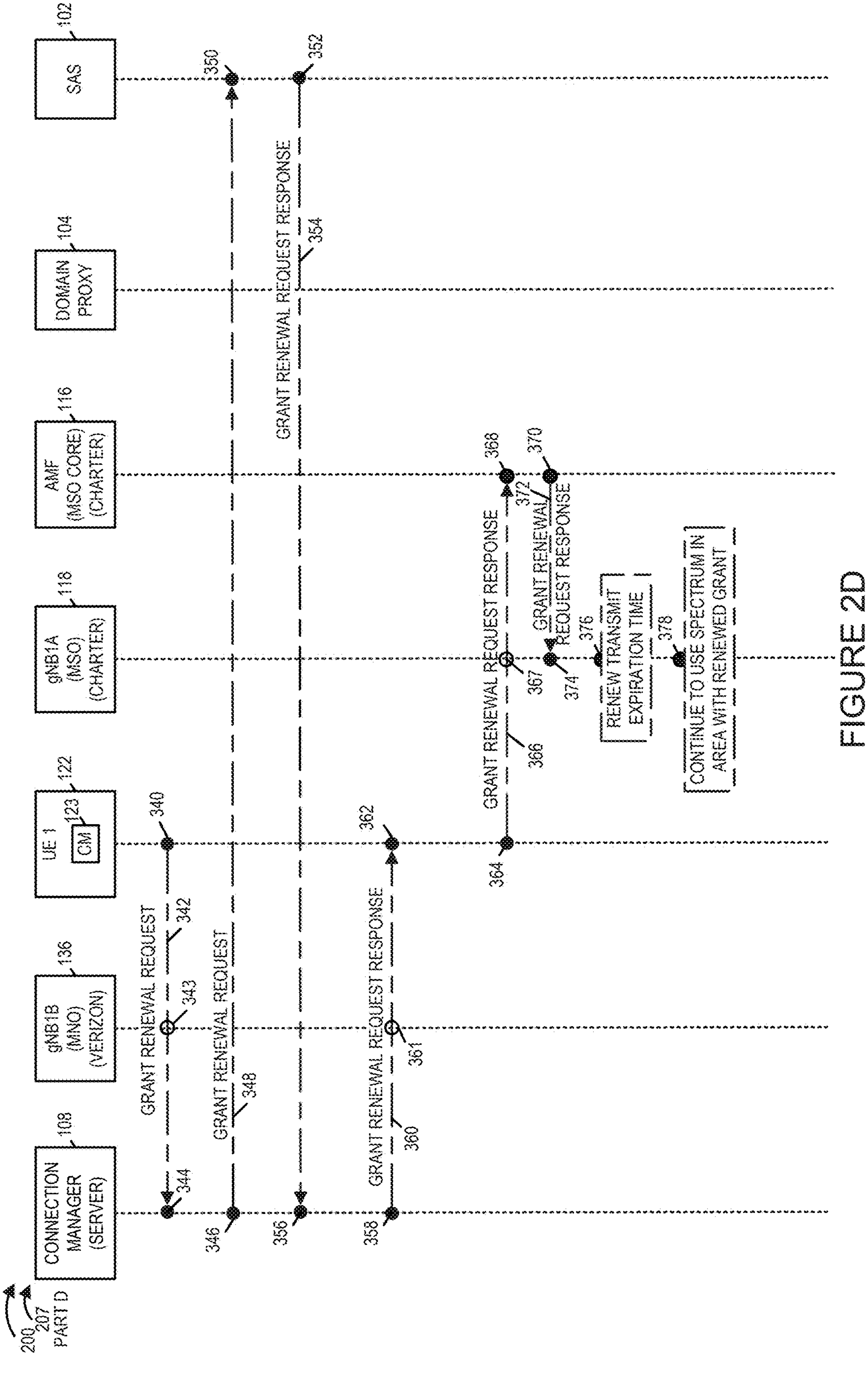
FIG. 2D is a fourth part of a signaling diagram comprising of an exemplary method of operating a communications system in accordance with an exemplary embodiment.
Figure 2:
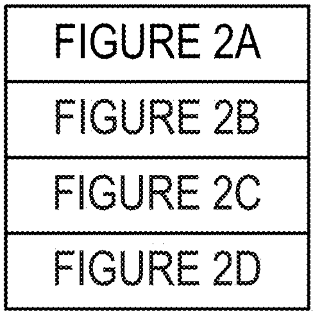
FIG. 2 comprises the combination of FIG. 2A, FIG. 2B, FIG. 2C and FIG. 2D.

FIG. 2, comprising the combination of FIG. 2A, FIG. 2B, FIG. 2C and FIG. 2D, is a signaling diagram 200, comprising Part A 201, Part B 203, Part C 205 and Part D 207, of an exemplary method of operating a communications system 100 in accordance with an exemplary embodiment. Consider that gNB1A 118, has been previously granted, by SAS 102, spectrum to use. In step 202, gNB1A base station 118 generates and sends grant renewal request message 204 to domain proxy 104. In step 206, domain proxy 104 may, and generally does, receive grant renewal request 204, and in step 208 domain proxy 104 may, and generally does, forward the received grant renewal request as message 210 to the SAS 102. In step 212 SAS 102 may, and generally does, receive grant renewal request 210 and process the renewal request. Assuming the spectrum is still available to be used by gNB1A 118, the SAS 102, in step 214, may, and generally does, generate and sends a positive grant renewal request response 216 to the domain proxy 104. The domain proxy 104 may, and generally does, receive the grant renewal request response 216 in step 218 and send a forwarded copy of the grant renewal request response in message 222 to gNB1A 118. The gNB1A 118 may, and generally does, receive and process the grant renewal request response message 222 in step 224.

There may be a problem along the communications path, e.g., in one of the interfaces of gNB1A 118, of domain proxy 104, or of SAS 102, or in on of the communications links along the path, as indicated by any of X's 226, 228, 230, 232, which results in the gNB1A 118 not receiving a grant renewal request response 222, in response to previously transmitted grant renewal request 204.

In step 234 gNB1A 118 detects reaching a predetermined time to grant expiration, without receiving a grant renewal request response from the SAS 102. In response to the detection of step 234, in step 236, gNB1A 118 generates and sends an upcoming timer expiration notification message 238 to AMF 116. In step 240 AMF 116 receives the upcoming timer notification message 238.

In response to receiving the upcoming timer notification message 238, the AMF 116, in step 242, determines whether or not there is an active UE with CM at gNB1A 118. Step 242 includes step 244 in which the AMF 116 determines that there is at least active UE with CM at gNB1A or step 246 in which the AMG 116 determines that there are no active UEs with CM at gNB1A.

Operation proceeds from step 244 to step 248; or alternatively, operation proceeds from step 246 to step 252. In step 248 the AMF 116 selects an active UE with CM from the at least one active UEs to be used for sending a grant renewal request to the connection manager server. Step 248 includes step 250 in which the AMF 116 selects an active UE, e.g. the AMF selects UE1 122, which is an active UE with CM.

In step 252 the AMF 116 identifies the last known active UE with CM at gNB1A 118. Step 252 includes step 254 in which the AMF 116 identifies UE1 122, as the last known active UE with CM at gNB1A 118. Operation proceeds from step 254 to information block 256, which indicates that UE 1 122 is in inactive mode. Operation proceeds from information block 256 to step 258. In step 258 the AMF 116 generates and sends radio access network (RAN) paging message 260 to gNB1A 118, requesting or commanding gNB1 118 to page UE 1 122, which is the last known active UE. In step 262, gNB1A 118 receives the RAN paging message 260, and in step 264 gNB1A 118 generates and transmits paging message 266 for UE1 122, which is the last known active UE.

In step 268 UE1 122, which is in inactive mode, detects paging message 266 and recognizes that it is being paged. In response to the detected paging message 266, UE1 122 and gNB1A 118 in step 270 are operated to perform RRC connection resume procedures. In steps 272 and 274, UE 1 122 and gNB1A 118 are operated, respectively, to communicate RRC connection resume signaling 276. In step 278, gNB1A 118 is operated to retrieve UE1 context, e.g., from the MSO core. In step 280 gNB1A 118 and AMF 116 are operated to perform RRC connection resume procedures. In steps 282 and 284, gNB1A 118 and AMF 116 are operated, respectively, to communicate RRC connection resume signaling 285. In step 286, UE1 122 is in RRC connected mode.

Operation proceeds from step 250 or step 286 to step 288. In step 288 AMF 116 generates and sends grant renewal request 290 (on behalf of gNB1A 118) to UE1 122. The grant renewal request message 290 is sometimes referred to as a heartbeat request message. The grant renewal request 290 is sent to UE1 122 via gNB1A 118, as indicated by circle 291. In step 292 UE1 122 receives the grant renewal request message 290. Operation proceeds from step 292 to step 294.

In step 294 UE1 122 decides whether to send the grant renewal request (on behalf of gNB1A 118) to the CM server 108 via the gNB1A 118 of MSO (e.g., Charter) or via the gNB1B 136 of MNO (e.g., Verizon). Step 294 includes step 296 in which UE1 122 including CM 123 decides to send the grant renewal request to the CM server 108 via gNB1A 118 of the MSO or step 298 in which UE1 122 including CM 123 decides to send the grant renewal request to the CM server 108 via gNB1B 136 of the MNO. Operation proceeds from step 296 of FIG. 2B to step 300 of FIG. 2C or alternatively, operation proceeds from step 298 of FIG. 2B to step 340 of FIG. 2D.

Returning to step 300, in step 300 UE1 122 generates and sends grant renewal request 302 to CM server 108 via gNB1A 118, as indicated by circle 303. In step 304 the CM server 108 receives the grant renewal request message 302, and in response, in step 306, the CM server 108 generates and sends grant renewal request message 308 (which is forwarded copy of grant renewal request message 302) to SAS 102. In step 310, SAS 102 receives and processes the grant renewal request 308. In step 312, the SAS 102 generates and sends a grant renewal request response 314 to the CM server 108. The grant renewal request response message 314 is sometimes referred to as a heartbeat message. In step 316 the CM server 108 receives the grant renewal request response 314. In step 318 the connection manager server 108 generates and sends grant renewal request response 320 (which is a forwarded copy of grant renewal request response 314) to UE1 122 including CM 123 via gNB1A 118, as indicated by circle 321. In step 322 UE1 122 receives the grant renewal request response 320, and in response in step 324, UE1 122 generates and sends grant renewal request response 326 to AMF 116 via gNB1A 118 as indicated by circle 327. In step 328 AMF 116 receives the grant renewal request response 326 and in response, in step 330 the AMF 116 generates and sends grant renewal request response 332 (which is a forwarded copy of message 326) to gNB1A 118. In step 334, gNB1A receives the grant renewal request response 334 and recovers the communicated information, e.g., a positive response indicating that the granted spectrum is being renewed. In step 336, gNB1A 118 renews transmit expiration time, and in step 338 gNB1A 118 continues to use spectrum in the area in accordance with the renewed grant.

Returning to step 334 of FIG. 2D, in step 340 UE1 122 generates and sends grant renewal request 354 to CM server 108 via gNB1B 136, as indicated by circle 343. In step 344 the CM server 108 receives the grant renewal request message 342, and in response, in step 346, the CM server 108 generates and sends grant renewal request message 348 (which is forwarded copy of grant renewal request message 342) to SAS 102. In step 350, SAS 102 receives and processes the grant renewal request 348. In step 352, the SAS 102 generates and sends a grant renewal request response 354 to the CM server 108. The grant renewal request response message 354 is sometimes referred to as a heartbeat message. In step 356 the CM server 108 receives the grant renewal request response 354. In step 358 the connection manager server 108 generates and sends grant renewal request response 360 (which is a forwarded copy of grant renewal request response 354) to UE1 122 including CM 123 via gNB1B 136, as indicated by circle 361. In step 362 UE1 122 receives the grant renewal request response 360, and in response in step 364, UE1 122 generates and sends grant renewal request response 366 to AMF 116 via gNB1A 118 as indicated by circle 367. In step 368 AMF 116 receives the grant renewal request response 366 and in response, in step 370 the AMF 116 generates and sends grant renewal request response 372 (which is a forwarded copy of message 366) to gNB1A 118. In step 374, gNB1A receives the grant renewal request response 372 and recovers the communicated information, e.g., a positive response indicating that the granted spectrum is being renewed. In step 376, gNB1A 118 renews transmit expiration time, and in step 378 gNB1A 118 continues to use spectrum in the area in accordance with the renewed grant.

Figure 3:
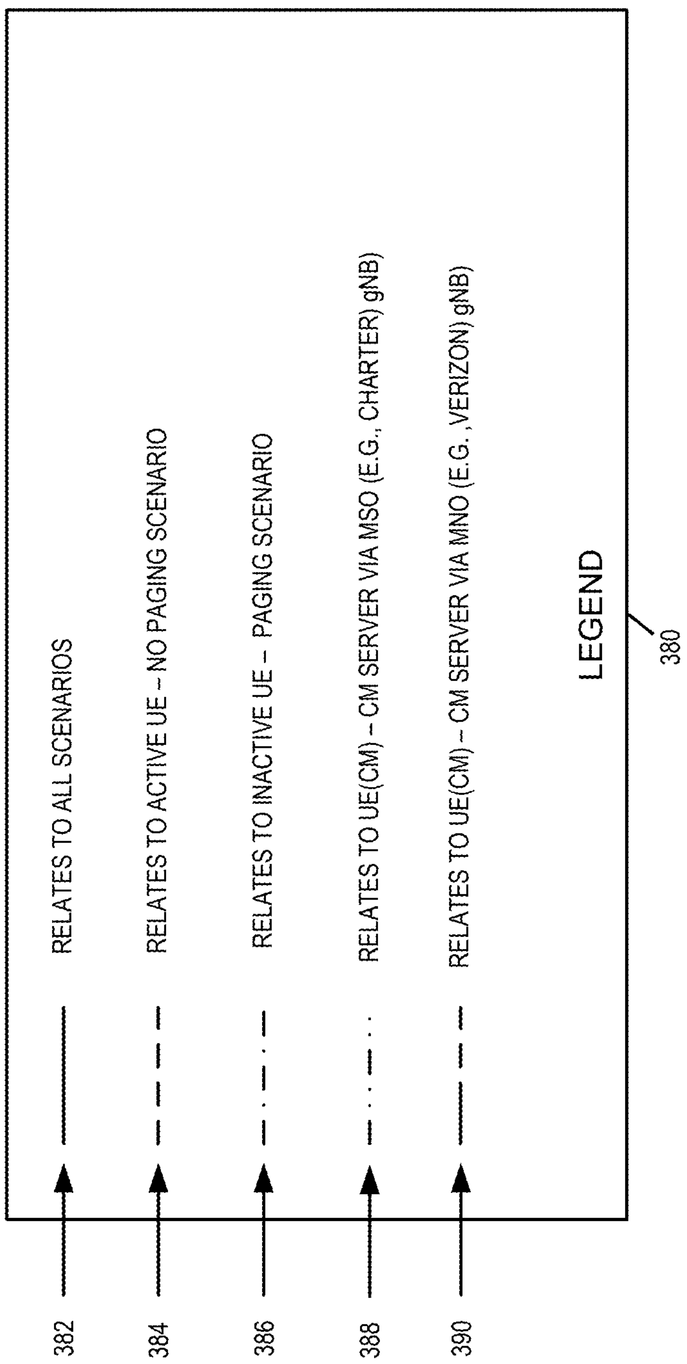
FIG. 3 is a legend, which is used to identify signaling, messaging, information and steps corresponding to different alternative scenarios with respect to the signaling diagrams of FIG. 2.

FIG. 3 is a legend 370, which is used to identify signaling, messaging, information and steps corresponding to different alternative scenarios with respect to the signaling diagrams of FIG. 2. Solid lines of type 372 are used to identify signaling, messaging, information and steps relating to all exemplary scenarios. Dashed lines of type 374 are used to identify signaling, messaging, information and steps relating to an identified active UE scenario—a no paging scenario. Dash/single dot lines of type 376 are used to identify signaling, messaging, information and steps relating to an inactive UE scenario—a paging scenario. Dash/double dot lines of type 378 are used to identify signaling, messaging, information and steps relating to UE (with CM)—CM server communication route scenario via MSO (e.g., Charter gNB). Long dash/short dash lines of type 380 are used to identify signaling, messaging, information and steps relating to UE (with CM)—CM server communication route scenario via MNO (e.g., Verizon gNB).

Figure 4:
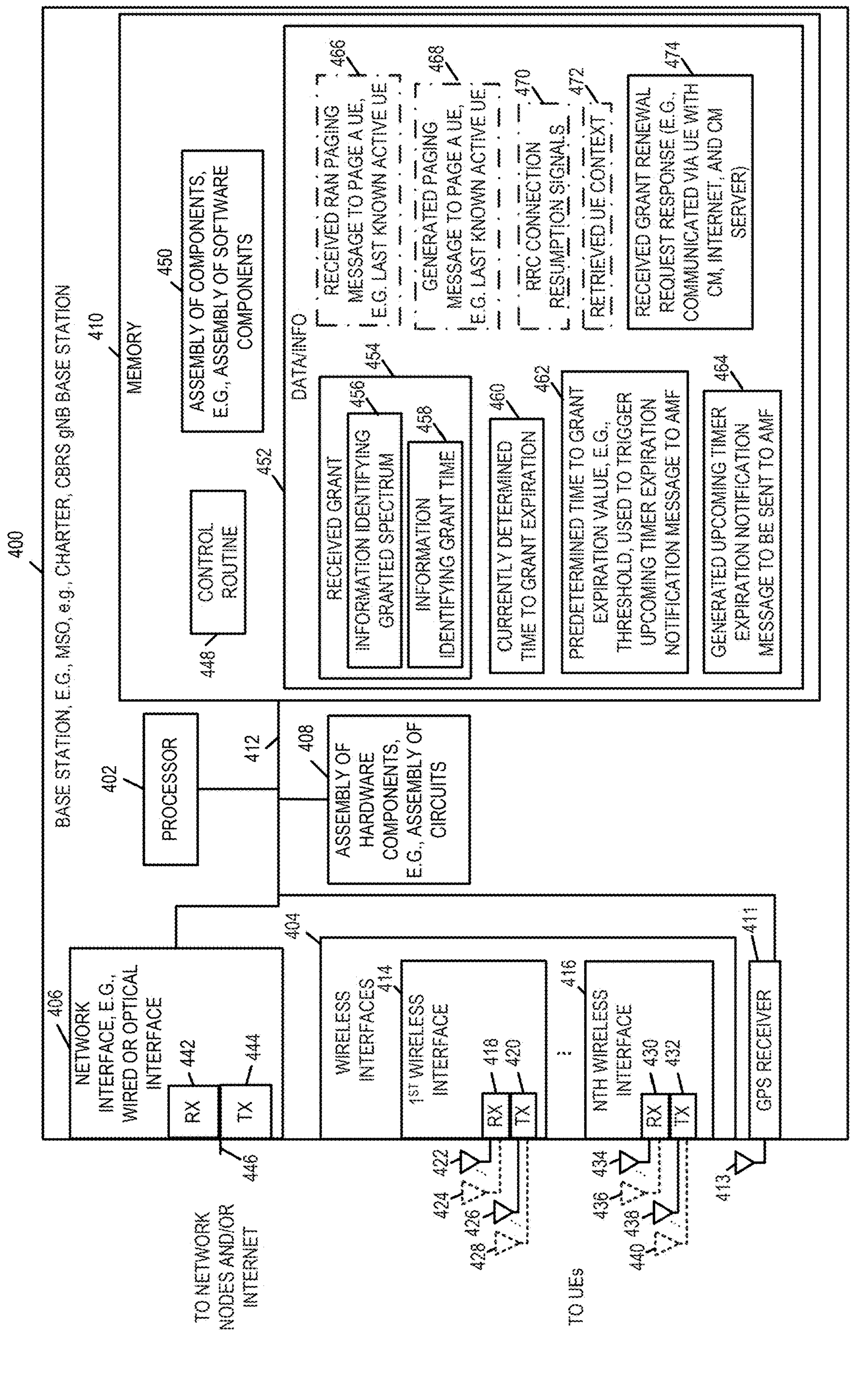
FIG. 4 is a drawing of an exemplary base station, e.g., a MSO CBRS gNB base station, in accordance with an exemplary embodiment.

FIG. 4 is a drawing of an exemplary base station 400, e.g., a MSO, e.g., Charter, CBRS gNB base station, in accordance with an exemplary embodiment. Exemplary base station 400 is, e.g., gNB1A base station 118 of FIG. 1 or FIG. 2, or gNBNA base station 120 of FIG. 1.

Exemplary base station 400 includes a processor 402, e.g., a CPU, wireless interfaces 404, a network interface 406, an assembly of hardware components 408, e.g., an assembly of circuits, and memory 410 coupled together via bus 412 over which the various elements may interchange data and information. In some embodiments, base station 400 further includes a GPS receiver 411 coupled to bus 412.

Wireless interfaces 404 includes one or more wireless interfaces (1 st wireless interface 414, . . . , Nth wireless interface 416). 1 st wireless interface 414 includes wireless receiver 418 and wireless transmitter 420. Wireless receiver 418 is coupled to one or more receiver antennas (422, . . . , 424) via which the base station 400 receives wireless uplink signals from UEs. Wireless transmitter 420 is coupled to one or more transmit antennas (426, . . . , 428) via which the base station 400 transmits wireless downlink signals to UEs. In some embodiments one or more antennas are used by both the receiver 418 and transmitter 420. Nth wireless interface 416 includes wireless receiver 430 and wireless transmitter 432. Wireless receiver 430 is coupled to one or more receiver antennas (434, . . . , 436) via which the base station 400 receives wireless uplink signals from UEs. Wireless transmitter 432 is coupled to one or more transmit antennas (438, . . . , 440) via which the base station 400 transmits wireless downlink signals to UEs. In some embodiments one or more antennas are used by both the receiver 430 and transmitter 432. In some embodiments different wireless interfaces correspond to different communications bands, different spectrum, and/or different communications protocols.

Network interface 406, e.g., a wired or optical interface, includes receiver 442, transmitter 444 and connector 446. Network interface 406 couples the base station to network nodes, e.g., other base stations, core network nodes, and a domain proxy, and/or the Internet.

GPS receiver 411 is coupled to GPS receive antenna 413. GPS signals, received via GPS receive antenna 413, are processed by the GPS receiver 411 to determine time, position, e.g. latitude, longitude and altitude, and velocity information. In some embodiment the GPS receiver 411 is used to facilitate a precise placement of the base station 400, e.g., as part of an installation process.

Memory 410 includes a control routine 448, an assembly of components 450 and data/information 452. Control routine 448 includes instructions which when executed by processor 402 control the base station 400 to implement basic operational functions, e.g., read memory, write to memory, control an interface, load a program, subroutine, or app, etc. Assembly of components 450, e.g., an assembly of software components, e.g., routines, subroutines, applications, etc., includes, e.g., code, e.g., machine executable instructions, which when executed by processor 402, controls the base station 400 to implement steps of a method, e.g., steps of the method of signaling diagram 200 of FIG. 2 performed by gNB1A 118.

Data/information 452 includes a received grant from a SAS, said grant allocating CBRS spectrum to base station 400 for a specified time interval. Received grant 454 includes information 456 identifying granted spectrum and information 458 identifying the time for which the grant is valid. Data/information 452 further includes a currently determined time to grant expiration 460, a predetermined time to grant expiration value 462, e.g., a predetermined threshold (e.g. 2 minutes), used to trigger generation and sending of an upcoming timer expiration notification message to an AMF, and a generated upcoming timer expiration message 464 to be sent to an AMF of the MSO. Data/information 452 may, and sometimes does, include a received RAN paging message 466, requesting the base station 400 to page a UE, e.g., the last known active UE, a generated paging message 468 to page a UE, e.g., the last known active UE, and radio resource control (RRC) connection resumption signals 470 and retrieved UE context 472. Data/information 452 further includes a received grant renewal response 474, e.g., communicated via a UE with connection manager (CM), Internet, and CM server.

Figure 5:
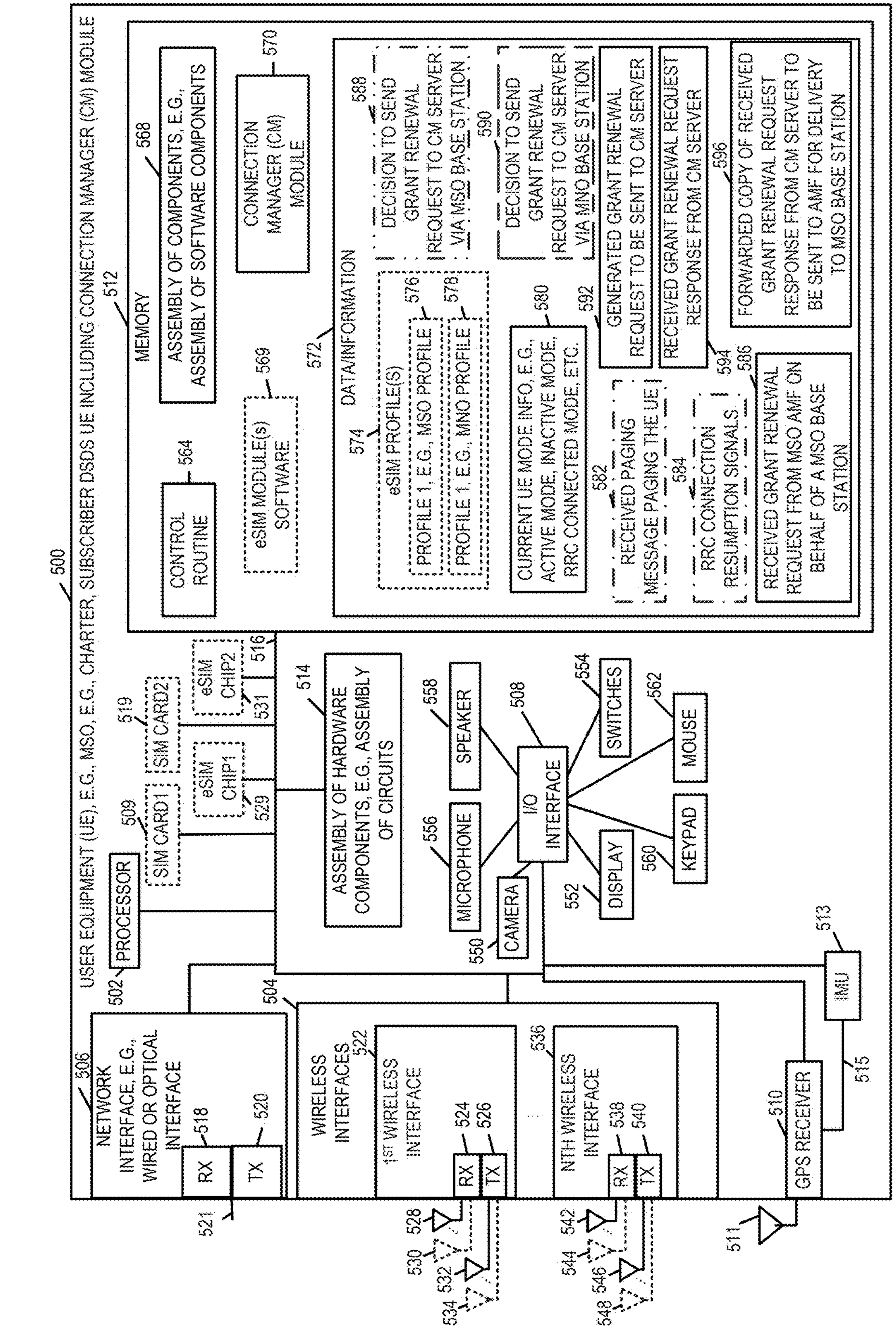
FIG. 5 is a drawing of an exemplary user equipment (UE), e.g., a MSO subscriber Dual Subscriber Identity Module (SIM) Dual Standby (DSDS) UE including a connection manager (CM) module, in accordance with an exemplary embodiment.

FIG. 5 is a drawing of an exemplary user equipment (UE) 500, e.g., a MSO, e.g., Charter, subscriber Dual Subscriber Identity Module (SIM) Dual Standby (DSDS) UE including a connection manager (CM) module, in accordance with an exemplary embodiment. Exemplary UE 500 of FIG. 5 is, e.g., UE1 122 of FIG. 1 or FIG. 2, UE2 124 of FIG. 1, or UEN 126 of FIG. 1.

Exemplary UE 500 includes a processor 502, e.g., a CPU, wireless interfaces 504, a network interface 506, e.g., a wired or optical interface, I/O interface 508, GPS receiver 510, inertial measurement unit (IMU) 513, and assembly of hardware components 514, e.g., an assembly of circuits, coupled together via bus 516 over which the various elements may interchange data and information. In various embodiments, UE 500 further includes one or more or all of: SIM card 1 509, SIM card 2 519, eSIM chip 1 529 and eSIM chip 2 531 coupled to bus 516. In some embodiments UE 500 includes 2 SIM cards (509, 519). In some embodiments, UE 500 includes one SIM card, e.g., SIM card 1 509 and one eSIM chip, e.g. eSIM chip 1 529. In still other embodiments, UE 500 includes 2 eSIM chips (eSIM chip 1 529, eSIM chip 2 531). In some embodiments UE 500 includes one SIM card, e.g., corresponding to a MSO, and one eSIM chip, e.g. with a loaded profile corresponding to a MNO.

Wireless interfaces 504 includes a plurality of wireless interfaces (1 st wireless interface 522, . . . , Nth wireless interface 536). 1st wireless interface 522 includes wireless receiver 524 and wireless transmitter 525. Wireless receiver 524 is coupled to one or more receiver antennas (528, . . . , 530) via which the UE 500 receives wireless downlink signals from base stations. Wireless transmitter 526 is coupled to one or more transmit antennas (532, . . . , 534) via which the UE 500 transmits wireless uplink signals to base stations. In some embodiments one or more antennas are used by both the receiver 524 and transmitter 526. Nth wireless interface 536 includes wireless receiver 538 and wireless transmitter 540. Wireless receiver 538 is coupled to one or more receiver antennas (542, . . . , 544) via which the UE 500 receives wireless downlink signals from base stations. Wireless transmitter 540 is coupled to one or more transmit antennas (546, . . . , 548) via which the UE 500 transmits wireless uplink signals to base stations. In some embodiments one or more antennas are used by both the receiver 538 and transmitter 540. In some embodiments different wireless interfaces correspond to different communications bands, different spectrum, and/or different communications protocols.

Network interface 506, e.g., a wired or optical interface, includes receiver 518, transmitter 520 and connector 521. Network interface 506 may, and sometimes does, couple UE 500 to base stations, network nodes and/or the Internet, e.g., when the UE 500 is stationary and located at a site with a wireline and/or optical connection.

GPS receiver 510 is coupled to GPS antenna 510. GPS receiver 510 is further coupled to IMU 513, e.g., an IMU on a chip including gyroscopes and accelerometers. GPS signals, received via GPS receive antenna 413, are processed by the GPS receiver 411 to determine time, position, e.g. latitude, longitude and altitude, and velocity information of UE 500. In some embodiments, information from IMU 513, e.g., accelerometer and/or gyroscopes measurements over time, are used, in conjunction with or in place of GPS measurements to determine position, e.g. latitude, longitude and altitude, and velocity information of UE 500.

SIM card 1 509 includes information corresponding to a first communications network operator, e.g. a MSO, e.g., Charter, to which the owner of UE 500 is a subscriber. SIM card 2 519 includes information corresponding to a second communications network operator, e.g. a MNO, e.g., Verizon, which is a partner of the first communications network operator. Each eSIM chip (529, 531) can be, and sometimes is loaded with eSIM module software 569 and a eSIM profile, e.g. profile 1 576, e.g., a MSO profile, or profile 2 578, e.g., a MNO profile. For example, eSIM chip 1 529 may be loaded with profile 1, e.g., a MSO profile, and eSIM chip 2 531 may be loaded with profile 2, e.g., a MNO profile.

UE 500 further includes a plurality of I/O devices (camera 550, display 552, e.g., a touch screen display, switches 554, microphone 556, speaker 558, keypad 560 and mouse 562) coupled to I/O interface 508, which couples the various I/O devices to other elements of the UE 500 via bus 516.

Memory 512 includes a control routine 564, an assembly of components 568, e.g., an assembly of software components, a connection manager (CM) module 570, eSIM module(s) software 569, e.g. to be loaded into e-SIM chip(s), and data/information 572. Control routine 564 includes instructions which when executed by processor 502 control the UE 500 to implement basic operational functions, e.g., read memory, write to memory, control an interface, load a program, subroutine, or app, etc. Connection manager module 570 interfaces with a CM server, e.g., CM server 108. CM module 570 makes decisions and/or controls a connection between UE 500 and a MSO base station and a connection between UE 500 and a MNO base station. CM module 570 supports DSDS functionality operations. eSIM module(s) software 569, when loaded into an eSIM chip, controls the eSIM chip to perform operations including loading different eSIM profiles at different times and controlling the eSIM chip to function as a SIM card. Assembly of components 568, e.g., an assembly of software components, e.g., routines, subroutines, applications, etc., includes, e.g., code, e.g., machine executable instructions, which when executed by processor 502, controls the UE 500 to implement steps of a method, e.g., steps of the method of signaling diagram 200 of FIG. 2 performed by UE1 122.

Data/information 572 includes eSIM profiles(s) 574 including prolife 1 576, e.g., a MSO profile, and profile 2 578, e.g., a MNO profile. Data/information 572 further includes current UE mode information 580, e.g., indicating active mode, inactive mode, RRC connected mode, etc. Data/information 572 may, and sometimes does includes a received paging message 582 paging UE 500, and RRC connection resumption signals 584. Data/information 572 further includes a received grant renewal request 586 from a MSO AMF on behalf of a MSO base station. Data/information 572 may, and sometimes does include information 588 indicating a decision to send the grant renewal request to the CM server via a MSO base station or information 590 indicating a decision to send the grant renewal request to the CM server via a MNO base station. Data/information 572 further includes a generated grant renewal request 592 to be sent to the CM server, which is a forwarded copy of the received grant renewal request 586, a received grant renewal request response 594 the CM server, indicating the SAS decision with regard to the renewal request, and a generated forwarded copy 596 of the received grant renewal request response for the CM server to be sent to the AMF for delivery to the MSO base station.

Figure 6:
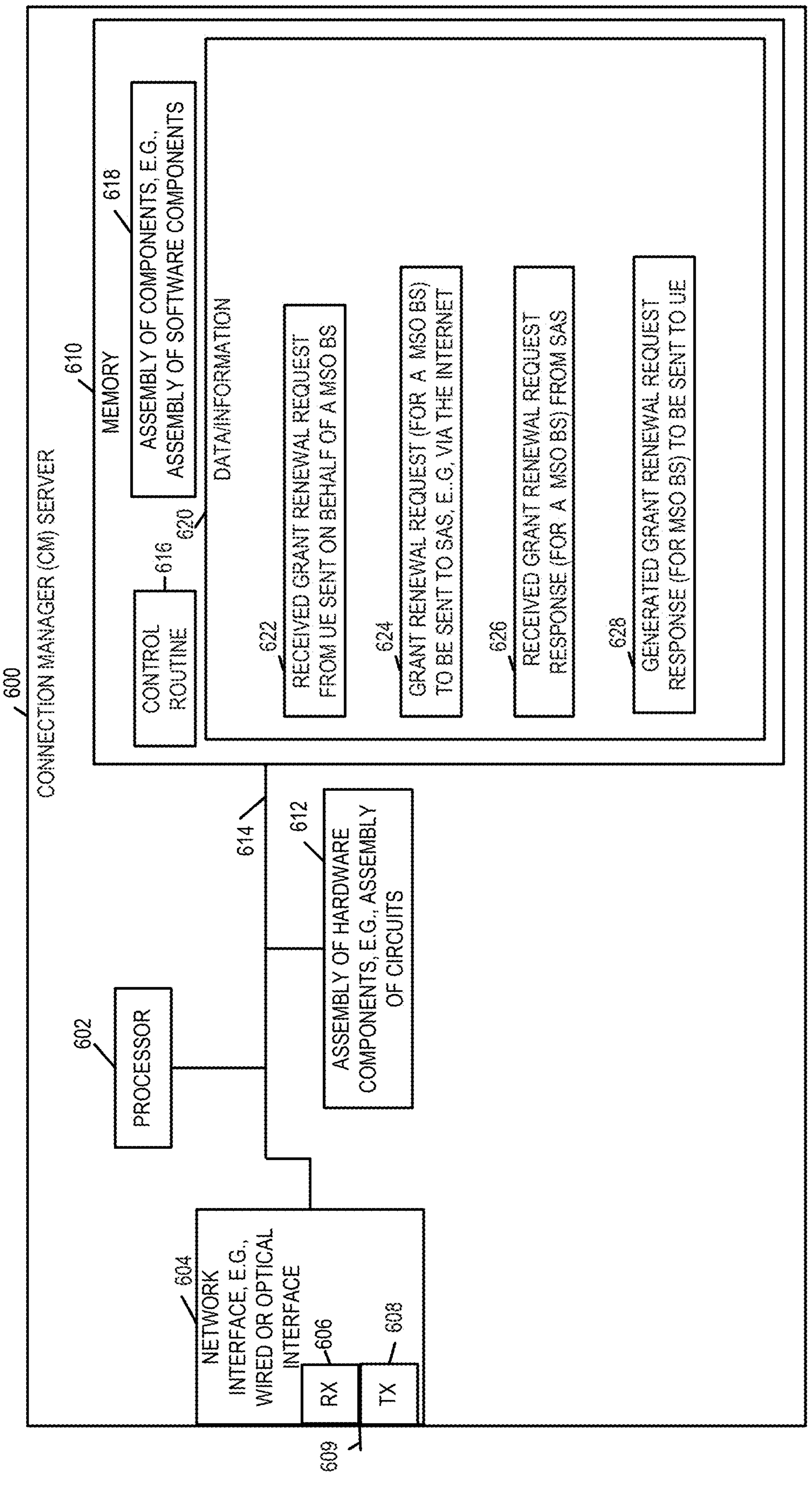
FIG. 6 is a drawing of an exemplary connection manager (CM) server in accordance with an exemplary embodiment.

FIG. 6 is a drawing of an exemplary connection manager (CM) server 600 in accordance with an exemplary embodiment. CM server 600 is, e.g., CM server 108 of FIG. 1 or FIG. 2. CM server 600 includes a processor 602, e.g., a CPU, a network interface 604, e.g., a wired or optical interface, memory 610, and an assembly of hardware components 612, e.g., an assembly of circuits, coupled together via a bus 614 over which the various elements may interchange data and information.

Network interface 604, e.g., a wired or optical interface, includes receiver 606, transmitter 608 and connector 609. Network interface 604 couples CM server 600 to SAS 102. Network interface 604 further couples the CM server 600 to a CM module in a UE, e.g., CM module 123 in UE1 122, via the Internet, a MSO core network, e.g., MSO core network 110, and a MSO base station, e.g. gNB1A 118. Network interface 604 further couples the CM server 600 to a CM module in a UE, e.g., CM module 123 in UE1 122, via the Internet, a MNO core network, e.g., MNO core network 128, and a MNO base station, e.g. gNB1B 136.

Memory 610 includes a control routine 616, an assembly of components 618 and data/information 620. Control routine 616 includes instructions which when executed by processor 602 control the CM server 600 to implement basic operational functions, e.g., read memory, write to memory, control an interface, load a program, subroutine, or app, etc. Assembly of components 618, e.g., an assembly of software components, e.g., routines, subroutines, applications, etc., includes, e.g., code, e.g., machine executable instructions, which when executed by processor 602, controls the CM server 600 to implement steps of a method, e.g., steps of the method of signaling diagram 200 of FIG. 2 performed by CM server 108. Data/information 620 includes a received grant renewal request 622 from the UE sent on behalf of a MSO base station, a generated grant renewal request 624 (for a MSO base station) to be sent to the SAS, e.g., via the Internet, a received grant renewal request response 626 (for a MSO base station) from the SAS, and a generated grant renewal request response 628 (for the MSO base station) to be sent to the UE.

Figure 7:
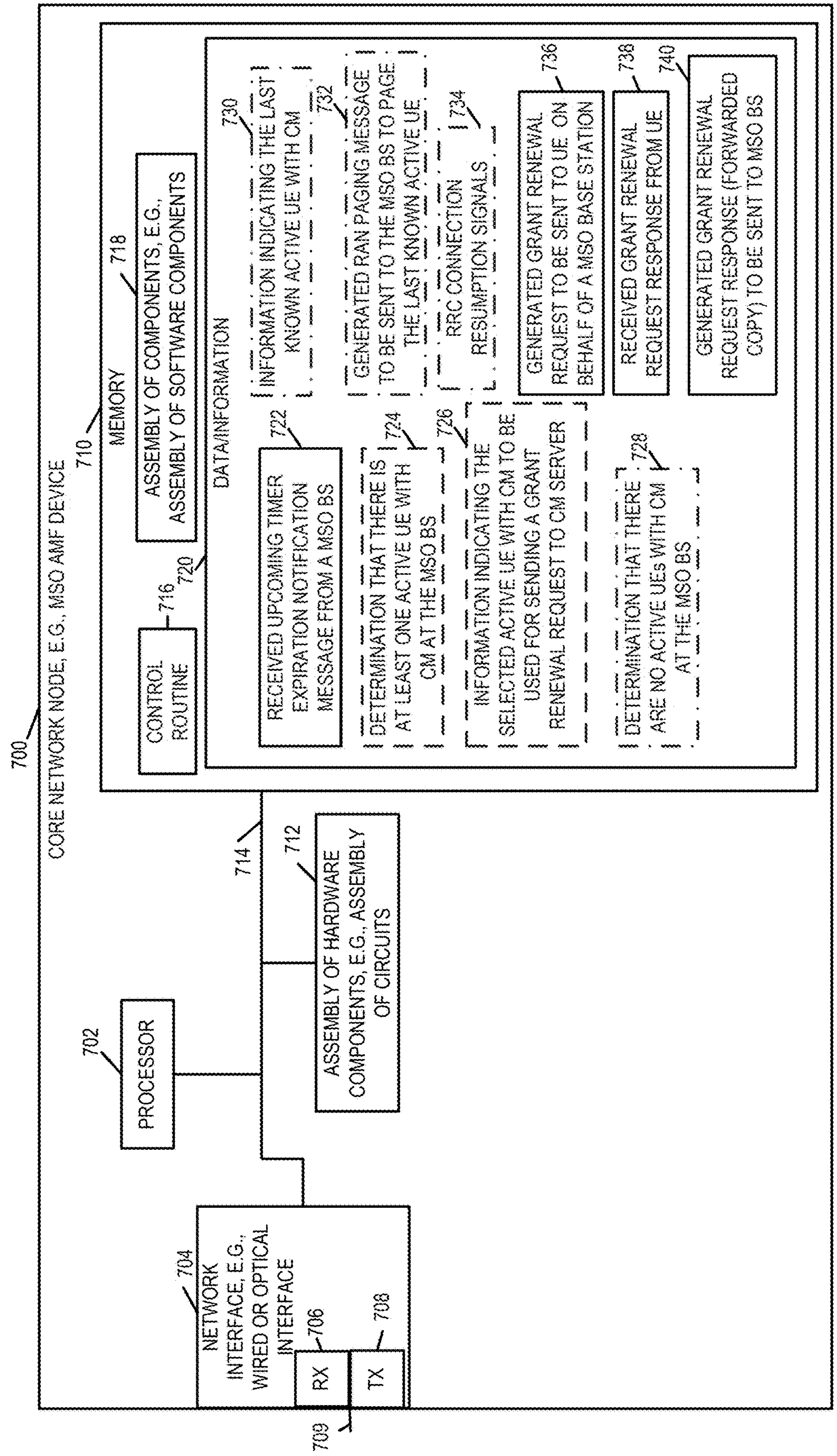
FIG. 7 is a drawing of an exemplary core network node, e.g., a device implementing a MSO access and mobility management function (AMF), in accordance with an exemplary embodiment.

FIG. 7 is a drawing of an exemplary core network node 700, e.g., a MSO access and mobility management function (AMF) device, in accordance with an exemplary embodiment. Core network node 700 is, e.g., a device implementing AMF 116 of FIG. 1 or FIG. 2.

Core network node 700 includes a processor 702, e.g., a CPU, a network interface 704, e.g., a wired or optical interface, memory 710, and an assembly of hardware components 712, e.g., an assembly of circuits, coupled together via a bus 714 over which the various elements may interchange data and information.

Network interface 704, e.g., a wired or optical interface, includes receiver 706, transmitter 708 and connector 709. Network interface 704 couples core network node 700 to other core network nodes, to base stations, to an OSS, and to the Internet.

Memory 710 includes a control routine 716, an assembly of components 718 and data/information 720. Control routine 716 includes instructions which when executed by processor 702 control the core network node 700 to implement basic operational functions, e.g., read memory, write to memory, control an interface, load a program, subroutine, or app, etc. Assembly of components 718, e.g., an assembly of software components, e.g., routines, subroutines, applications, etc., includes, e.g., code, e.g., machine executable instructions, which when executed by processor 702, controls the core network node 700 to implement steps of a method, e.g., steps of the method of signaling diagram 200 of FIG. 2 performed by AMF 116. In some embodiment core network node 700 implements a plurality of core network functions, e.g., AMF, SMF and UPF.

Data/information 720 includes a received upcoming timer expiration notification message 722 from a MSO base station. In some embodiments, data/information 720 may, and sometimes does, includes a determination 724 that there is at least one active UE with CM at the MSO base station, and information 726 indicating the selected active UE with CM to be used for sending a grant renewal request to the CM server for delivery to the SAS. In some embodiments, data/information 720 may, and sometimes does, includes a determination 728 that there are no active UEs with CM, information 730 indicating the last known active UE with CM, a generated RAN paging request or command message 732 to be sent to the MSO base station requesting or commanding the MSO base station to page the last known active UE, and RRC connection resumption signals 734. Data/information 720 further includes a generated grant renewal request 736 to be sent to a UE on behalf of a MSO base station for communication to SAS via CM server, a received grant renewal request response 734 from the UE conveying the SAS response to the request 736, and a generated grant renewal request response 740, which conveys a forwarded copy of the SAS response, said generated grant renewal request response 740 to be sent to the MSO base station, which originally sent the upcoming timer expiration notification message 722 to the AMF, which is part of core network node 700.

Figure 8:
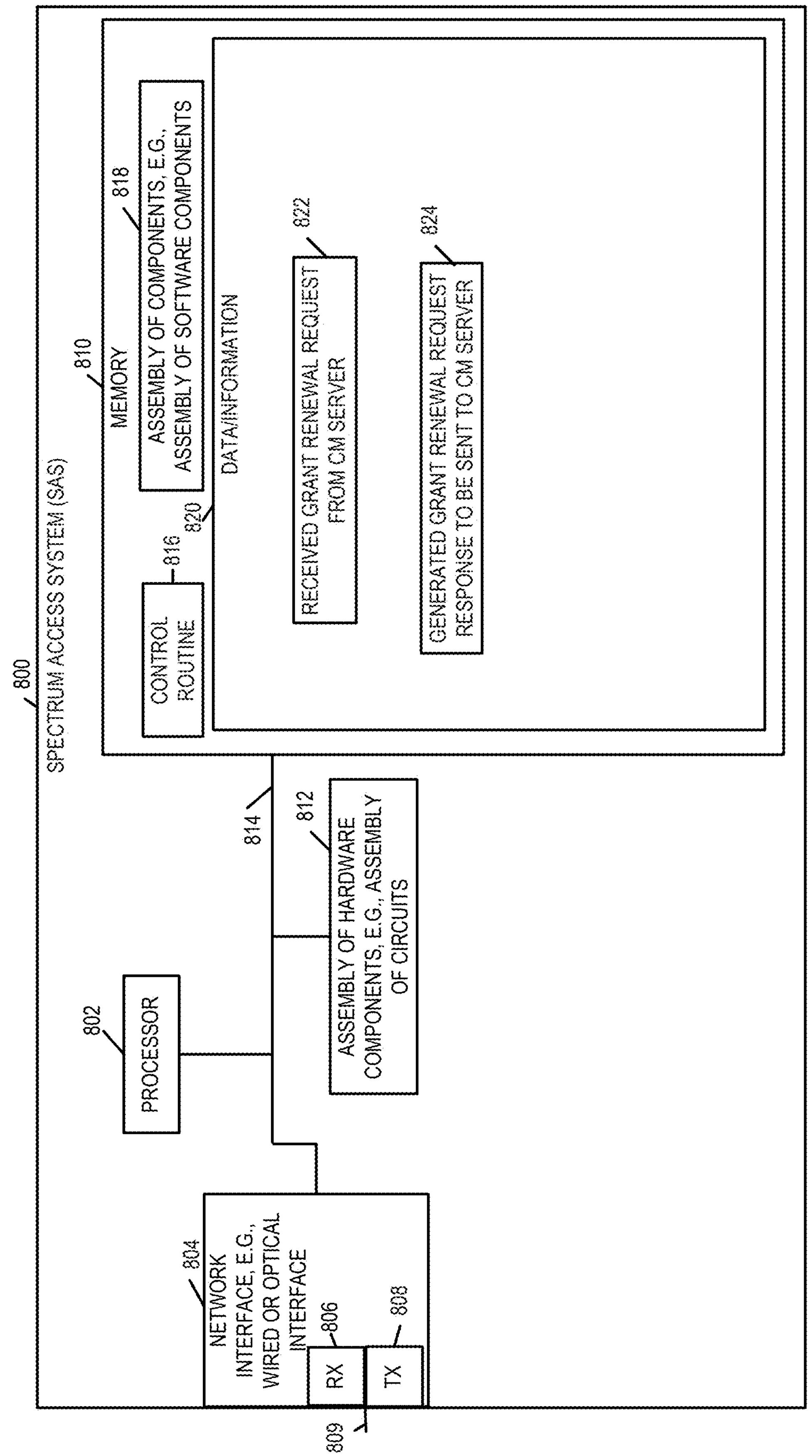
FIG. 8 is a drawing of an exemplary spectrum access system (SAS), e.g., a SAS which allocates spectrum, e.g., CBRS spectrum, to base stations, in accordance with an exemplary embodiment.

FIG. 8 is a drawing of an exemplary spectrum access system (SAS) 800 in accordance with an exemplary embodiment. SAS 800 is, e.g., SAS 102 of FIG. 1 or FIG. 2.

SAS 800 includes a processor 802, e.g., a CPU, a network interface 804, e.g., a wired or optical interface, memory 810, and an assembly of hardware components 812, e.g., an assembly of circuits, coupled together via a bus 814 over which the various elements may interchange data and information.

Network interface 804, e.g., a wired or optical interface, includes receiver 806, transmitter 808 and connector 809. Network interface 804 couples SAS 800 to a domain proxy, e.g., domain proxy 104 and to a CM server, e.g., CM server 108, and/or to the Internet.

Memory 810 includes a control routine 816, an assembly of components 818 and data/information 820. Control routine 816 includes instructions which when executed by processor 802 control the SAS 800 to implement basic operational functions, e.g., read memory, write to memory, control an interface, load a program, subroutine, or app, etc. Assembly of components 818, e.g., an assembly of software components, e.g., routines, subroutines, applications, etc., includes, e.g., code, e.g., machine executable instructions, which when executed by processor 802, controls the SAS 800 to implement steps of a method, e.g., steps of the method of signaling diagram 200 of FIG. 2 performed by SAS 102. Data/information 820 includes a received grant renewal request 822 from a CM server, which was sent on behalf of a MSO base station, which is experiencing communications problems with the SAS when using its normal communications path with the SAS, and a generated grant renewal request response 824, e.g., indicating that the grant is to be renewed, to be sent to the CM server in response to request 822, said generated grant renewal request response 824 intended to be delivered to the MSO base station, which generated and sent an upcoming timer expiration notification message to the MSO AMF.

Figure 9:
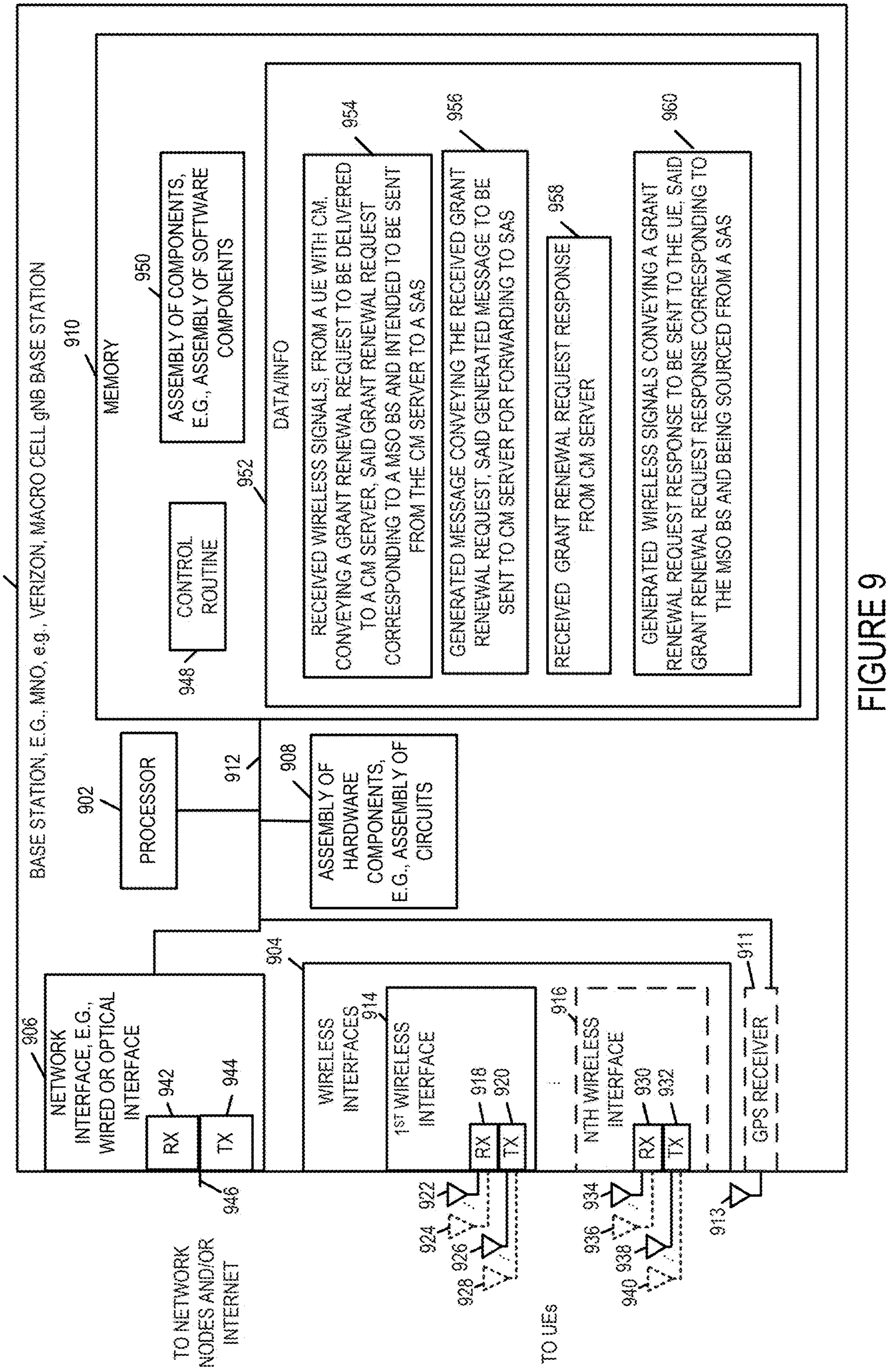
FIG. 9 is a drawing of an exemplary base station, e.g., a MNO macro cell gNB base station, in accordance with an exemplary embodiment.

FIG. 9 is a drawing of an exemplary base station 900, e.g., a MNO, e.g. Verizon, macro cell gNB base station, in accordance with an exemplary embodiment. Exemplary base station 900 is, e.g., gNB1B base station 136 of FIG. 1 or FIG. 2.

Exemplary base station 900 includes a processor 902, e.g., a CPU, wireless interfaces 904, a network interface 906, an assembly of hardware components 908, e.g., an assembly of circuits, and memory 910 coupled together via bus 912 over which the various elements may interchange data and information. In some embodiments, base station 900 further includes a GPS receiver 911 coupled to bus 912.

Wireless interfaces 904 includes one or more wireless interfaces (1 st wireless interface 914, . . . , Nth wireless interface 916). 1st wireless interface 914 includes wireless receiver 918 and wireless transmitter 920. Wireless receiver 918 is coupled to one or more receiver antennas (922, . . . , 924) via which the base station 900 receives wireless uplink signals from UEs. Wireless transmitter 920 is coupled to one or more transmit antennas (926, . . . , 928) via which the base station 900 transmits wireless downlink signals to UEs. In some embodiments one or more antennas are used by both the receiver 918 and transmitter 920. Nth wireless interface 916 includes wireless receiver 930 and wireless transmitter 932. Wireless receiver 930 is coupled to one or more receiver antennas (934, . . . , 936) via which the base station 900 receives wireless uplink signals from UEs. Wireless transmitter 932 is coupled to one or more transmit antennas (938, . . . , 940) via which the base station 900 transmits wireless downlink signals to UEs. In some embodiments one or more antennas are used by both the receiver 930 and transmitter 932. In some embodiments different wireless interfaces correspond to different communications bands, different spectrum, and/or different communications protocols.

Network interface 906, e.g., a wired or optical interface, includes receiver 942, transmitter 944 and connector 946. Network interface 906 couples the base station to network nodes, e.g., other base stations, core network nodes, and a domain proxy, and/or the Internet.

GPS receiver 911 is coupled to GPS receive antenna 913. GPS signals, received via GPS receive antenna 913, are processed by the GPS receiver 911 to determine time, position, e.g. latitude, longitude and altitude, and velocity information. In some embodiment the GPS receiver 911 is used to facilitate a precise placement of the base station 900, e.g., as part of an installation process.

Memory 910 includes a control routine 948, an assembly of components 950 and data/information 952. Control routine 948 includes instructions which when executed by processor 902 control the base station 900 to implement basic operational functions, e.g., read memory, write to memory, control an interface, load a program, subroutine, or app, etc. Assembly of components 950, e.g., an assembly of software components, e.g., routines, subroutines, applications, etc., includes, e.g., code, e.g., machine executable instructions, which when executed by processor 902, controls the base station 900 to implement steps of a method, e.g., steps of the method of signaling diagram 200 of FIG. 2 performed by gNB1B 136.

Data/information 952 includes a received wireless signals 954, from a UE with CM, conveying a grant renewal request to be delivered to a CM server, said grant renewal request corresponding to a MSO base station and intended to be sent from the CM server to a SAS, a generated message 956 conveying the received grant renewal request, said generated message to be sent to the CM server for forwarding to SAS, a received grant renewal request response 958 from CM server conveying the SAS response, and generated wireless signals 960 conveying the received grant renewal request response, said generated wireless signals to be sent to the UE, said grant renewal request response corresponding to the MSO base station and being sourced from a SAS.

Various aspects and/or features of the present invention are described below. SAS delivers heartbeat to the nodes, e.g., MSO CBRS gNB base stations, to allow them to continue transmission. If the heartbeat is absent, the cell (gNB CBRS base station) will stop transmitting because the transmit expiration timer will not get updated. This will cause the gNB to stop transmitting and to lose service.

It is quite possible that sometimes, due to network issues, SAS related issues or a domain proxy/OSS related issue, the heartbeat is not delivered to the radio although it is permitted from the SAS. In that case the cell will stop transmitting and UEs will lose service.

In accordance with the present invention, methods and apparatus are implemented to provide an alternative means to establish a communications path to SAS to continue the heartbeat reception.

In some embodiments, in accordance with the present invention, when a base station, e.g., a MSO CBRS gNB base station, stops getting a heartbeat, the base station will reach out, e.g., via a MSO AMF, to a UE, e.g., a DSDS UE with CM, that is within reasonable distance, to get help. The selected or identified UE with CM will reach out, e.g., via the MSO network, a MNO network or a MVNO network, e.g., depending upon the CM alternative path selection, to communicate with SAS and get heartbeat confirmation via an alternative communications path, e.g., a communications path that does not include the domain proxy. In this way, the base station, e.g. MSO gNB CBRS base station, can continue to transmit.

In this exemplary case, described above, it is assumed that the base station, e.g. MSO gNB CBRS base station, e.g., a CBSD, is unable to renew the grant via the traditional communications path between the base station and SAS, which includes a domain proxy, or the base station is assumed to have expired its timer and unable to communicate with the UEs. In some embodiments, the core, e.g., MSO core AMF, will identify and/or select a UE, e.g., a DSDS UE with CM, within the footprint of the base station, e.g., an active UE with CM, and send a message, e.g., grant renewal request message to the identified or selected UE with to be delivered to the SAS via the alternative path. Subsequently, a response message, e.g., a grant renewal request response message, e.g., indicating that the SAS spectrum grant has been renewed for the base station, will be received by the AMF, said response being sourced from the SAS and being communicated via the alternative communications path including the UE with CM, and the response is forwarded to the base station, e.g., MSO gNB CBRS base station, which is experiencing communications problems along its traditional communications path with the SAS. Thus, the base station, e.g., MSO gNB CBRS base station, can continue transmitting using the SAS allocated spectrum and continue servicing its UEs.

Referring to FIG. 1, the interface between gNB1A 118 and domain proxy 104 (corresponding to connection 168) or between domain proxy 104 and SAS 102 (corresponding to connection 166) or both (corresponding to connections 168 and 166) may go down and be down. This will result in MSO gNB1A 118 not getting the heartbeat sourced from the SAS 102. However, it is very much a possibility that the rest of MSO core interfaces are intact, e.g. the radio of MSO gNB1A 118 could continue to function as normal and provide wireless services to UEs.

In some embodiments, if there is an active UE with CM, e.g., an active DSDS UE with CM present within the footprint of MSO gNB1A 118, the methods and apparatus, in accordance with the present invention, provide an alternative route between the SAS 102 and gNB1A 118.

The gNB1A 118 will detect that there is a lack of grant while the grant expiry time is about to expire and notify the core/OSS, e.g., notify the AMF 116 of MSO core 110. Note that different implementations are possible. Assume that the connection manager (CM) server 108 will be subscribed to OSS 106 for SAS connectivity failure, i.e., only SAS connectivity failure alarm with their codes are forwarded to connection manager.

The MSO core network 110, e.g., AMF 116, will send out a message, e.g., a grant renewal request message, to UE 122 with the gNB1A 118 information, e.g., information identifying the base station gNB1A 118 and information identify the SAS spectrum grant to the base station.

The gNB1A 118 information will be sent over the MSO network or the MSO network, e.g. depending upon the CM application 123 in UE 122 selection, to a network entity, e.g., CM server 108, which will translate this information to a SAS friendly format and communicate with SAS 102 to confirm whether or not to renew the grant. This information, e.g., the SAS grant request response indicating whether or not the SAS has renewed the grant, will be conveyed back to gNB1A 118.

In the case where the grant is suspended or not renewed the radio in gNB1A 118 will be operated not to transmit; otherwise, the radio in gNBB1A 118 will continue to transmit with the new heartbeat message.

CBRS radios need continuous heartbeat to continue to operate. This heartbeat is received from SAS or Domain Proxy that works on behalf of SAS. A base station, e.g., a gNB CBRS base station, can lose its connectivity with SAS or domain proxy and hence may not be able to renew its grant. However, it is possible that the base station, gNB CBRS base station, does not have an active UE in the system and therefore is unable to use a UE to renew its grant.

In some embodiments, in accordance with the present invention, methods and apparatus implement and use a method which makes use of a radio access network (RAN) paging concept and approach to reach a UE in inactive state to convey the grant related information, e.g., a grant renewal request message, to SAS to confirm availability of the SAS grant, e.g., in a DSDS environment.

In this exemplary scenario, e.g., corresponding to the network architecture of FIG. 1, the cell, e.g. MSO gNB1A 118 base station, with an expiring grant has some UEs within its footprint. However, in this scenario consider that each of the UEs within the base station's footprint are inactive. An exemplary step in this exemplary method of the present invention includes finding at least one inactive UE that can help with the renewal of the grant. For example, the MSO AMF 116 identifies the last active UE, e.g., UE 122 with CM 123, within the base station's footprint and sends a message, e.g., RAN paging message, to trigger the base station 118 to page the identified UE 122. Then, assuming the UE 122 responds to the page, operations are performed to cause RRC re-connection of the UE 122 and transition the UE 122 to an RRC connected state. Then, the AMF 116 sends a message, e.g., a grant renewal request message, to the UE 122 for delivery to the SAS 102 by an alternative path, e.g., an alternative path which does not include the domain proxy. The AMF 116 subsequently receives a request response message, e.g. a grant renewal request response message, sourced from the SAS 102 communicated via the alternative path including the UE 122, and the AMF 116 forwards received SAS grant renewal request response, e.g., indicating whether or not the grant is renewed, to the base station 118.

In the case where the grant is suspended or not renewed the radio in gNB1A 118 will be operated not to transmit; otherwise, in the case where the received message indicates that the grant is renewed the radio in gNBB1A 118 will continue to transmit with the new heartbeat message.

Numbered List of Exemplary Method Embodiments

Method Embodiment 1. A communications method comprising: detecting (234), at a first base station (MSO gNB1A 118), reaching a predetermined time to Spectrum Access System (SAS) resource grant expiration (e.g., within 2 minutes of the time that the resource grant will expire) (e.g., due to a failure of the first base station (118) to receive a heartbeat message required to maintain an existing resource grant or failure of the SAS (102) to receive a resource grant renewal request required due to the upcoming expiration of an existing resource grant or failure of the first base station (118) to receive a resource grant renewal request response from the SAS (102)) (e.g., due to a failure of the implemented communications path between the SAS (102) and the first base station (118), said implemented communications path including interfaces of the SAS (102), domain proxy (104), and first base station (118) and links between the elements (102, 104, 118)); sending (236), from the first base station (118), in response to reaching the predetermined time to grant expiration, an upcoming timer expiration message (238) to an AMF (MSO AMF 116); and operating the AMF (116) to send (288) a grant renewal request (290) corresponding to the first base station (118) to a first UE (UE 1 122) for communication to an SAS (102) (e.g., a heartbeat message or SAS resource grant request, seeking renewal of SAS granted resources for the first base station (118)) corresponding to the first base station (118)) (e.g., the AMF (116) sends a grant renewal request for the first base station (118) to the first UE (122) for communication to the SAS (102) on behalf of the first base station (118) via communications connectivity available to the first UE (UE 1 122)).

Method Embodiment 1AA. The method of Method Embodiment 1, further comprising: operating the first UE (122) to communicate (300 or 340) the grant renewal request corresponding to the first base station (118) to the SAS (102).

Method Embodiment 1AB. The method of Method Embodiment 1AA, wherein a connection manager application (123) on the first UE (122) sends the grant renewal request to a connection manager server (108) for forwarding to the SAS (102).

Method Embodiment 1A. The method of Method Embodiment 1, wherein said first base station (118) is a Citizens Broadband Radio Services (CBRS) base station.

Method Embodiment 2. The method of Method Embodiment 1, further comprising: prior to operating the AMF (116) to send (288) the grant renewal request (290) corresponding to the first base station (118) to the first UE (122), operating the AMF (116) to determine (242) whether or not there is at least one active UE with a connection manager at the first base station (118); and in response to determining (244) that there is at least one active UE with a connection manager at the first base station (118), selecting (248) an active UE with a connection manager to be used for communicating the grant renewal request on behalf of the first base station (118), said first UE (122) being the selected active UE.

Method Embodiment 3. The method of Method Embodiment 1, further comprising: prior to operating the AMF (116) to send (288) the grant renewal request (290) corresponding to the first base station (118) to the first UE (122), operating the AMF (116) to determine (242) whether or not there is at least one active UE with a connection manager at the first base station (118); and in response to determining (246) that there is not at least one active UE with a connection manager at the first base station (118), identifying (252), at the AMF (116), the last known active UE with a connection manager at the first base station (118), said first UE (122) being identified (254) as the last known active UE with a connection manager at the first base station (118); and sending (258) from the AMF (116), a RAN paging message (e.g., to the first base station (118)) to trigger paging of the first UE (122).

Method Embodiment 4. The method of Method Embodiment 1, further comprising: operating the first UE (122) to receive (322 or 362) a grant renewal request response to the grant renewal request corresponding to the first base station (118) (e.g., a response to the grant renewal request that was communicated to the SAS (102) by the first UE (122) for the benefit of the first base station (118)).

Method Embodiment 5. The method of Method Embodiment 4, further comprising: operating the first UE (122) to communicate (324 or 366) the grant renewal request response (e.g., the grant renewal request response corresponding to the grant renewal corresponding to the first base station (118)) to the AMF (116).

Method Embodiment 6. The method of Method Embodiment 5, further comprising: operating the AMF (116) to communicate (330 or 370) the grant renewal request response to the first base station (118) to which the grant renewal response relates.

Method Embodiment 7. The method of Method Embodiment 6, further comprising: operating the first base station (118) to receive (334 or 374) the grant renewal request response.

Method Embodiment 8. The method of Method Embodiment 7, wherein the grant renewal request response received by the first base station (118) indicates that the SAS (102) renewed the grant of resources to the first base station (118); and wherein the method further comprises: operating the first base station (118), in response to receiving the grant renewal request response, to reset (336 or 376) a transmit expiration timer relating to SAS granted resources; and continue to use (338 or 378) spectrum authorized by the SAS to be used by the first base station (118) in accordance with the renewed resource grant.

Method Embodiment 9. The method of Method Embodiment 4, wherein operating the first UE (122) to communicate (300 or 340) the grant renewal request corresponding to the first base station (118) to the SAS (102) includes: operating the first UE (122) to communicate the grant renewal request via the first base station (118) and a connection manager server (108) which has connectivity to the SAS (102).

Method Embodiment 9A. The method of Method Embodiment 9, wherein operating the first UE (122) to receive (322) a grant renewal request response to the grant renewal request corresponding to the first base station (118) includes: operating the first UE (122) to receive the grant renewal request via the connection manager server (108) and the first base station (108).

Method Embodiment 10. The method of Method Embodiment 4, wherein operating the first UE (122) to communicate (300 or 340) the grant renewal request corresponding to the first base station (118) to the SAS (102) includes: operating the first UE (122) to communicate (334) the grant renewal request via a second base station (MNO gNB1B 136) and a connection manager server (108) which has connectivity to the SAS (102).

Method Embodiment 10A. The method of Method Embodiment 10, wherein operating the first UE (122) to receive (322 or 362) a grant renewal request response to the grant renewal request corresponding to the first base station (118) includes:

operating the first UE (122) to receive the grant renewal request via the connection manager server (108) and the second base station (136).

Method Embodiment 10B. The method of Method Embodiment 10A, wherein the first base station (118) is located in a first network (e.g., a MSO network, e.g., Charter network, including small cell CBRS base stations owned by the MSO); and wherein the second base station (136) is located in a second network (e.g., a MNO network, e.g., a Verizon network, including macro cell base stations owned by the MNO, which are allowed to be used by subscriber UEs of the MSO network in accordance with an agreement between the MSO and the MNO).

Method Embodiment 10C. The method of Method Embodiment 10A, wherein the first UE (122) is a dual SIM UE; wherein the first base station (118) is located in a first network which the UE (122) can access using a first SIM in the first UE (122); and wherein the second base station (136) is located in a second network which the first UE (122) can access using a second SIM in the first UE (122).

Method Embodiment 10C1. The method of Method Embodiment 10C, wherein the first UE (122) is a dual SIM dual standby (DSDS) UE.

Method Embodiment 10D. The method of Method Embodiment 10C wherein the first and second SIMs are implemented using removable SIM cards.

Method Embodiment 10E. The method of Method Embodiment 10C, wherein the first and second SIMs are implemented using first and second profiles loaded on eSIM chips. Method Embodiment 10F. The method of Method Embodiment 10C, wherein one of the first and second SIMs is implemented using a removable SIM card, and wherein the other one of the first and second SIMs is implemented using a profile loaded on an eSIM chip.

Numbered List of Exemplary System Embodiments

System Embodiment 1. A communications system (100) comprising: a first base station (MSO gNB1A 118 or 400) including a first processor (402); and an access and mobility management function (AMF) device (116 or 700) including a second processor (702; and wherein said first processor (402) is configured to operate the first base station to: detect (234), at a first base station (MSO gNB1A 118), reaching a predetermined time to Spectrum Access System (SAS) resource grant expiration (e.g., within 2 minutes of the time that the resource grant will expire) (e.g., due to a failure of the first base station (118) to receive a heartbeat message required to maintain an existing resource grant or failure of the SAS (102) to receive a resource grant renewal request required due to the upcoming expiration of an existing resource grant or failure of the first base station (118) to receive a resource grant renewal request response from the SAS (102)) (e.g., due to a failure of the implemented communications path between the SAS (102) and the first base station (118), said implemented communications path including interfaces of the SAS (102), domain proxy (104), and first base station (118) and links between the elements (102, 104, 118)); send (236), from the first base station (118), in response to reaching the predetermined time to grant expiration, an upcoming timer expiration message (238) to an AMF (MSO AMF 116); and wherein said second processor (702) is configured to: operate the AMF (116) to send (288) a grant renewal request (290) corresponding to the first base station (118) to a first UE (UE 1 122) for communication to an SAS (102) (e.g., a heartbeat message or SAS resource grant request, seeking renewal of SAS granted resources for the first base station (118)) corresponding to the first base station (118)) (e.g., the AMF (116) sends a grant renewal request for the first base station (118) to the first UE (122) for communication to the SAS (102) on behalf of the first base station (118) via communications connectivity available to the first UE (UE 1 122)).

System Embodiment 1AA. The communications system (100) of System Embodiment 1, further comprising: said first UE (UE 1 122 or 500) including a third processor (502) configured to: operate the first UE (122) to communicate (300 or 340) the grant renewal request corresponding to the first base station (118) to the SAS (102).

System Embodiment 1AB. The communications system (100) of System Embodiment 1AA, wherein said first UE includes a connection manager application (123), and wherein a connection manager application (123) on the first UE (122) sends the grant renewal request to a connection manager server (108) for forwarding to the SAS (102).

System Embodiment 1A. The communications system (100) of System Embodiment 1, wherein said first base station (118) is a Citizens Broadband Radio Services (CBRS) base station.

System Embodiment 2. The communications system of System Embodiment 1, wherein said second processor (702) is further configured to operate the AMF (116) to: determine (242) whether or not there is at least one active UE with a connection manager at the first base station (118), said determination being performed prior to operating the AMF (116) to send (288) the grant renewal request (290) corresponding to the first base station (118) to the first UE (122); and in response to determining (244) that there is at least one active UE with a connection manager at the first base station (118), select (248) an active UE with a connection manager to be used for communicating the grant renewal request on behalf of the first base station (118), said first UE (122) being the selected active UE.

System Embodiment 3. The communications system of System Embodiment 1, wherein said second processor (702) is further configured to operate the AMF (116) to: determine (242) whether or not there is at least one active UE with a connection manager at the first base station (118), said determination being performed prior to operating the AMF (116) to send (288) the grant renewal request (290) corresponding to the first base station (118) to the first UE (122); and in response to determining (246) that there is not at least one active UE with a connection manager at the first base station (118), identify (252), at the AMF (116), the last known active UE with a connection manager at the first base station (118), said first UE (122) being identified (254) as the last known active UE with a connection manager at the first base station (118); and send (258) from the AMF (116), a RAN paging message (e.g., to the first base station (118)) to trigger paging of the first UE (122).

System Embodiment 4. The communications system of System Embodiment 1, further comprising said first UE, said first UE including a third processor (502) configured to: operate the first UE (122) to receive (322 or 362) a grant renewal request response to the grant renewal request corresponding to the first base station (118) (e.g., a response to the grant renewal request that was communicated to the SAS (102) by the first UE (122) for the benefit of the first base station (118)).

System Embodiment 5. The communications system of System Embodiment 4, wherein said third processor (502) is further configured to: operate the first UE (122) to communicate (324 or 366) the grant renewal request response (e.g., the grant renewal request response corresponding to the grant renewal corresponding to the first base station (118)) to the AMF (116).

System Embodiment 6. The communications system of System Embodiment 5, wherein said second processor (702) is further configured to: operate the AMF (116) to communicate (330 or 370) the grant renewal request response to the first base station (118) to which the grant renewal response relates.

System Embodiment 7. The communications system of System Embodiment 6, wherein said first processor (402) is further configured to: operate the first base station (118) to receive (334 or 374) the grant renewal request response.

System Embodiment 8. The communications system of System Embodiment 7, wherein the grant renewal request response received by the first base station (118) indicates that the SAS (102) renewed the grant of resources to the first base station (118); and wherein the first processor (402) is further configured to: operate the first base station (118), in response to receiving the grant renewal request response, to reset (336 or 376) a transmit expiration timer relating to SAS granted resources; and continue to use (338 or 378) spectrum authorized by the SAS to be used by the first base station (118) in accordance with the renewed resource grant.

System Embodiment 9. The communications system of System Embodiment 4, wherein operating the first UE (122) to communicate (300 or 340) the grant renewal request corresponding to the first base station (118) to the SAS (102) includes: operating the first UE (122) to communicate the grant renewal request via the first base station (118) and a connection manager server (108) which has connectivity to the SAS (102).

System Embodiment 9A. The communications system of System Embodiment 9, wherein operating the first UE (122) to receive (322) a grant renewal request response to the grant renewal request corresponding to the first base station (118) includes: operating the first UE (122) to receive the grant renewal request via the connection manager server (108) and the first base station (108).

System Embodiment 10. The communications system of System Embodiment 4, wherein operating the first UE (122) to communicate (300 or 340) the grant renewal request corresponding to the first base station (118) to the SAS (102) includes: operating the first UE (122) to communicate (334) the grant renewal request via a second base station (MNO gNB1B 136) and a connection manager server (108) which has connectivity to the SAS (102).

System Embodiment 10A. The communications system of System Embodiment 10, wherein operating the first UE (122) to receive (322 or 362) a grant renewal request response to the grant renewal request corresponding to the first base station (118) includes: operating the first UE (122) to receive the grant renewal request via the connection manager server (108) and the second base station (136).

System Embodiment 10B. The communications system of System Embodiment 10A, wherein the first base station (118) is located in a first network (e.g., a MSO network, e.g., Charter network, including small cell CBRS base stations owned by the MSO); and wherein the second base station (136) is located in a second network (e.g., a MNO network, e.g., a Verizon network, including macro cell base stations owned by the MNO, which are allowed to be used by subscriber UEs of the MSO network in accordance with an agreement between the MSO and the MNO).

System Embodiment 10C. The communications system of System Embodiment 10A, wherein the first UE (122) is a dual SIM UE; wherein the first base station (118) is located in a first network which the UE (122) can access using a first SIM in the first UE (122); and wherein the second base station (136) is located in a second network which the first UE (122) can access using a second SIM in the first UE (122).

System Embodiment 10C1. The communications system of System Embodiment 10C, wherein the first UE (122) is a dual SIM dual standby (DSDS) UE.

System Embodiment 10D. The communications system of System Embodiment 10C, wherein the first and second SIMs are implemented using removable SIM cards (509, 519).

System Embodiment 10E. The method of System Embodiment 10C, wherein the first and second SIMs are implemented using first and second profiles (576, 578) loaded on eSIM chips (529, 531).

System Embodiment 10F. The method of System Embodiment 10C, wherein one of the first and second SIMs is implemented using a removable SIM card (509), and wherein the other one of the first and second SIMs is implemented using a profile (578) loaded on an eSIM chip (531).

Various embodiments are directed to apparatus, e.g., base stations, e.g., MSO CBRS gNB base stations and MNO macro gNB base stations, UEs including CM, servers, e.g. CM servers, core nodes, e.g., AMF core nodes, SAS, Domain Proxies, OSS, sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. base station, e.g., a MSO CBRS gNB base station, MNO macro gNB base station, a UE including CM, a server, e.g. CM server, a core nodes, e.g., AMF core node, a Domain Proxy, an OSS, a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MSO network, a MNO network and/or a MVNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g., MSO CBRS gNB base station, a MNO macro gNB base station, a UE including CM, a server, e.g. CM server, core nodes, e.g., a AMF core node, a SAS, a Domain Proxies, an OSS, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station, e.g., MSO CBRS gNB base station, a MNO macro gNB base station, a UE including CM, a server, e.g. CM server, a core node, e.g., an AMF core node, a SAS, a Domain Proxy, an OSS, a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:

detecting, at a first base station, reaching a predetermined time to Spectrum Access System (SAS) resource grant expiration;

sending, from the first base station, in response to reaching the predetermined time to SAS resource grant expiration, an upcoming timer expiration message to an Access and Mobility Management Function (AMF); and operating the AMF to send a grant renewal request corresponding to the first base station to a first UE for communication to an SAS.

2. The method of claim 1, further comprising:

prior to operating the AMF to send the grant renewal request corresponding to the first base station to the first UE, operating the AMF to determine whether or not there is at least one active UE with a connection manager at the first base station; and in response to determining that there is at least one active UE with a connection manager at the first base station, selecting an active UE with a connection manager to be used for communicating the grant renewal request on behalf of the first base station, said first UE being the selected active UE.

3. The method of claim 1, further comprising:

prior to operating the AMF to send the grant renewal request corresponding to the first base station to the first UE, operating the AMF to determine whether or not there is at least one active UE with a connection manager at the first base station; and in response to determining that there is not at least one active UE with a connection manager at the first base station, identifying, at the AMF, the last known active UE with a connection manager at the first base station, said first UE being identified as the last known active UE with a connection manager at the first base station; and sending from the AMF, a Radio Access Network (RAN) paging message to trigger paging of the first UE.

4. The method of claim 1, further comprising:

operating the first UE to receive a grant renewal request response to the grant renewal request corresponding to the first base station.

5. The method of claim 4, further comprising:

operating the first UE to communicate the grant renewal request to the AMF.

6. The method of claim 5, further comprising:

operating the AMF to communicate the grant renewal request response to the first base station to which the grant renewal response relates.

7. The method of claim 6, further comprising:

operating the first base station to receive the grant renewal request response.

8. The method of claim 7, wherein the grant renewal request response received by the first base station indicates that the SAS renewed the grant of resources to the first base station; and wherein the method further comprises:

operating the first base station, in response to receiving the grant renewal request response, to reset a transmit expiration timer relating to SAS granted resources; and continue to use spectrum authorized by the SAS to be used by the first base station in accordance with the renewed resource grant.

9. The method of claim 4, wherein operating the first UE to communicate the grant renewal request corresponding to the first base station to the SAS includes:

operating the first UE to communicate the grant renewal request via the first base station and a connection manager server which has connectivity to the SAS.

10. The method of claim 4, wherein operating the first UE to communicate the grant renewal request corresponding to the first base station to the SAS includes:

operating the first UE to communicate the grant renewal request via a second base station and a connection manager server which has connectivity to the SAS.

11. A communications system comprising:

a first base station including a first processor; and an access and mobility management function (AMF) device including a second processor; and wherein said first processor is configured to operate the first base station to:

detect, at a first base station, reaching a predetermined time to Spectrum Access System (SAS) resource grant expiration;

send, from the first base station, in response to reaching the predetermined time to SAS resource grant expiration, an upcoming timer expiration message to the AMF; and wherein said second processor is configured to:

operate the AMF to send a grant renewal request corresponding to the first base station to a first UE for communication to an SAS.

12. The communications system of claim 11, wherein said second processor is further configured to operate the AMF to:

determine whether or not there is at least one active UE with a connection manager at the first base station, said determination being performed prior to operating the AMF to send the grant renewal request corresponding to the first base station to the first UE; and in response to determining that there is at least one active UE with a connection manager at the first base station, select an active UE with a connection manager to be used for communicating the grant renewal request on behalf of the first base station, said first UE being the selected active UE.

13. The communications system of claim 11, wherein said second processor is further configured to operate the AMF to:

determine whether or not there is at least one active UE with a connection manager at the first base station, said determination being performed prior to operating the AMF to send the grant renewal request corresponding to the first base station to the first UE; and in response to determining that there is not at least one active UE with a connection manager at the first base station, identify, at the AMF, the last known active UE with a connection manager at the first base station, said first UE being identified as the last known active UE with a connection manager at the first base station; and send from the AMF, a radio access network (RAN) RAN paging message to trigger paging of the first UE.

14. The communications system of claim 11, further comprising said first UE, said first UE including a third processor configured to:

operate the first UE to receive a grant renewal request response to the grant renewal request corresponding to the first base station.

15. The communications system of claim 14, wherein said third processor is further configured to:

operate the first UE to communicate the grant renewal request response to the AMF.

16. The communications system of claim 15, wherein said second processor is further configured to:

operate the AMF to communicate the grant renewal request response to the first base station to which the grant renewal response relates.

17. The communications system of claim 16, wherein said first processor is further configured to:

operate the first base station to receive the grant renewal request response.

18. The communications system of claim 17, wherein the grant renewal request response received by the first base station indicates that the SAS renewed the grant of resources to the first base station; and wherein the first processor is further configured to:

operate the first base station, in response to receiving the grant renewal request response, to reset a transmit expiration timer relating to SAS granted resources; and continue to use spectrum authorized by the SAS to be used by the first base station in accordance with the renewed resource grant.

19. The communications system of claim 14, wherein operating the first UE to communicate the grant renewal request corresponding to the first base station to the SAS includes:

operating the first UE to communicate the grant renewal request via the first base station and a connection manager server which has connectivity to the SAS.

20. The communications system of claim 14, wherein operating the first UE to communicate the grant renewal request corresponding to the first base station to the SAS includes:

operating the first UE to communicate the grant renewal request via a second base station and a connection manager server which has connectivity to the SAS.

* * * * *